US011419147B2

(12) United States Patent
Lei et al.

(10) Patent No.: US 11,419,147 B2
(45) Date of Patent: Aug. 16, 2022

(54) BEAM ASSOCIATION IN RANDOM ACCESS PROCEDURES

(71) Applicant: QUALCOMM Incorporated, San Diego, CA (US)

(72) Inventors: Jing Lei, San Diego, CA (US); Wanshi Chen, San Diego, CA (US); Peter Pui Lok Ang, San Diego, CA (US); Joseph Binamira Soriaga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 116 days.

(21) Appl. No.: 16/887,970

(22) Filed: May 29, 2020

(65) Prior Publication Data
US 2020/0383141 A1 Dec. 3, 2020

Related U.S. Application Data

(60) Provisional application No. 62/856,683, filed on Jun. 3, 2019.

(51) Int. Cl.
*H04W 74/08* (2009.01)
*H04W 8/24* (2009.01)
(Continued)

(52) U.S. Cl.
CPC ......... *H04W 74/0808* (2013.01); *H04W 8/24* (2013.01); *H04W 56/001* (2013.01); *H04W 72/046* (2013.01); *H04W 74/0891* (2013.01)

(58) Field of Classification Search
CPC ............... H04W 8/24; H04W 74/0891; H04W 74/0833; H04W 74/0808; H04W 72/046; H04W 56/001; H04B 7/0695
See application file for complete search history.

(56) References Cited

U.S. PATENT DOCUMENTS

2018/0110075 A1\* 4/2018 Ly ..................... H04W 74/0833
2019/0075598 A1\* 3/2019 Li .......................... H04W 76/11
(Continued)

OTHER PUBLICATIONS

"3rd Generation Partnership Project, Technical Specification Group Radio Access Network NR, Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.5.0, Apr. 9, 2019 (Apr. 9, 2019), pp. 1-78, XP051723351, [retrieved on Apr. 9, 2019] section 1 section 5.1.

(Continued)

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may determine a mapping between synchronization signal blocks (SSBs) and a random access message of a two-step random access procedure based on an indication in system information signaling or radio resource control (RRC) signaling. The random access message may include a random access preamble and a random access payload. The UE may determine, based on the mapping, an association between one or more beams carrying the SSBs and one or more additional beams carrying the random access preamble and the random access payload of the random access message. As a result, the UE may perform the two-step random access procedure with a base station according to the beam association, and coexist with a four-step random access procedure in a more reliable and efficient manner.

58 Claims, 20 Drawing Sheets

(51) Int. Cl.
*H04W 72/04* (2009.01)
*H04W 56/00* (2009.01)

(56) References Cited

U.S. PATENT DOCUMENTS

2020/0267768 A1* 8/2020 Hakola .............. H04L 1/0003
2020/0314917 A1* 10/2020 Jeon .................. H04W 74/08
2021/0378025 A1* 12/2021 Lin .................... H04W 74/004

OTHER PUBLICATIONS

Huawei, et al., "RACH Type Switching Between 2-steps, 4-steps RACH and CFRA", 3GPP Draft, R2-1907733, Discussion on RACH Type Switching Between 2-steps, 4-steps RACH and CFRA, 3rd Generation Partnership Project (3GPP), Mobile Competence Centre, 650, Route Des Lucioles, F-06921, vol. RAN WG2, No. Reno, Nevada, US, Apr. 13, 2019-May 17, 2019, May 13, 2019 (May 13, 2019), XP051731164, 7 pages, Retrieved from the Internet: URL: http://www.3gpp.org/ftp/Meetings%5F3GPP%5FSYNC/RAN2/Docs/R2%2D1907733%2Ezip. [retrieved on May 13, 2019] the whole document.
International Search Report and Written Opinion—PCT/US2020/035594—ISA/EPO—dated Aug. 26, 2020.
Nokia, et al., "On 2-Step RACH Procedure", 3GPP TSG RAN WG1 #97, R1-1906747, Reno, USA, May 13, 2019-May 17, 2019, May 17, 2019 (May 17, 2019), pp. 1-23, Retrieved from the Internet: URL: http://www.3gpp.org/ftp/Meetings%5F3GPP%5FSYNC/RAN1/Docs/R1%2D1906747%2Ezip. [retrieved on May 13, 2019], Sections 1-2.
Qualcomm Incorporated: "Procedures for Two-Step RACH", 3GPP TSG-RAN WG1 Meeting #97, R1-1907256, May 13, 2019-May 17, 2019, Reno, USA, May 17, 2019 (May 17, 2019), pp. 1-13, Retrieved from the Internet: URL: http://www.3gpp.org/ftp/Meetings%5F3GPP%5FSYNC/RAN1/Docs/R1%2D1907256%2Ezip. [retrieved on May 13, 2019], Section 2.

* cited by examiner

BEAM ASSOCIATION IN RANDOM ACCESS PROCEDURES

CROSS REFERENCE

The present Application for Patent claims the benefit of U.S. Provisional Patent Application No. 62/856,683 by LEI et al., entitled "BEAM ASSOCIATION IN RANDOM ACCESS PROCEDURES," filed Jun. 3, 2019, assigned to the assignee hereof, and expressly incorporated herein.

FIELD OF TECHNOLOGY

The following relates generally to wireless communications and more specifically to beam association in random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support one or more random access procedures. The random access procedures may involve a series of handshake messages exchanged between UEs and base stations. As demand for wireless communication system efficiency increases, some wireless communications systems may fail to provide robustness for beam association and enhanced random access messaging, and therefore improved techniques are desired.

SUMMARY

The described techniques relate to improved methods, systems, devices, and apparatuses that support beam association in random access procedures. Generally, the described techniques provide for a user equipment (UE) to determine a mapping between synchronization signal blocks (SSBs) and a random access message, for example, relating to a two-step random access procedure. The UE may also determine an association between one or more respective directional beams carrying the SSBs and one or more additional respective directional beams carrying the random access message (e.g., a random access preamble and a random access payload of the random access message).

Additionally, the described techniques may include, in some examples, mapping time and frequency resources of the SSBs to one or more physical random access channel (PRACH) occasions (ROs) of the random access preamble and one or more physical uplink shared channel (PUSCH) resource units (PRUs) of the random access payload over PRACH configuration periods of an association pattern period of the two-step random access procedure. Additionally or alternatively, the described techniques may include beam association for a random access fallback procedure and a random access switch procedure. The described techniques may therefore include features for improved resource usage and allocation for random access messaging, improved reliability for random access messaging and, in some examples, may promote low latency for random access procedures, among other benefits.

A method of wireless communication at a user equipment is described. The method may include determining a mapping between synchronization signal blocks and a random access message of a two-step random access procedure based on an indication, the random access message including a random access preamble and a random access payload, determining, based on the mapping, an association between one or more beams carrying the synchronization signal blocks and one or more additional beams carrying the random access preamble and the random access payload of the random access message, and performing the two-step random access procedure with a base station.

An apparatus for wireless communication at a user equipment is described. The apparatus may include a processor, memory coupled with the processor, and instructions stored in the memory. The instructions may be executable by the processor to cause the apparatus to determine a mapping between synchronization signal blocks and a random access message of a two-step random access procedure based on an indication, the random access message including a random access preamble and a random access payload, determine, based on the mapping, an association between one or more beams carrying the synchronization signal blocks and one or more additional beams carrying the random access preamble and the random access payload of the random access message, and perform the two-step random access procedure with a base station.

Another apparatus for wireless communication at a user equipment is described. The apparatus may include means for determining a mapping between synchronization signal blocks and a random access message of a two-step random access procedure based on an indication, the random access message including a random access preamble and a random access payload, determining, based on the mapping, an association between one or more beams carrying the synchronization signal blocks and one or more additional beams carrying the random access preamble and the random access payload of the random access message, and performing the two-step random access procedure with a base station.

A non-transitory computer-readable medium storing code for wireless communication at a user equipment is described. The code may include instructions executable by a processor to determine a mapping between synchronization signal blocks and a random access message of a two-step random access procedure based on an indication, the random access message including a random access preamble and a random access payload, determine, based on the mapping, an association between one or more beams carrying the synchronization signal blocks and one or more additional beams carrying the random access preamble and the random access payload of the random access message, and perform the two-step random access procedure with a base station.

Some examples of the method, apparatuses, and non-transitory computer-readable medium described herein may further include operations, features, means, or instructions for mapping resources of the synchronization signal blocks to one or more physical random access channel occasions of the random access preamble and one or more physical uplink shared channel resource units of the random access payload over physical random access channel configuration periods of an association pattern period of the two-step random access procedure.

Some examples of the method, apparatuses, and non-transitory computer-readable medium described herein may further include operations, features, means, or instructions for determining the association pattern period of the two-step random access procedure based on a second indication, where the association pattern period of the two-step random access procedure may be based on a factor value of an association pattern period of a four-step random access procedure, the factor value including an integer value within a range configured by a network.

Some examples of the method, apparatuses, and non-transitory computer-readable medium described herein may further include operations, features, means, or instructions for determining a second association between the one or more beams carrying the synchronization signal blocks and the one or more additional beams carrying the random access preamble and the random access payload of the random access message over additional physical random access channel configuration periods of a second association pattern period of the two-step random access procedure, and where the second association over the second association pattern period of the two-step random access procedure may be different from the association over the association pattern period of the two-step random access procedure.

Some examples of the method, apparatuses, and non-transitory computer-readable medium described herein may further include operations, features, means, or instructions for receiving, from the base station, signaling including the indication including the association between the one or more beams carrying the synchronization signal blocks and the one or more additional beams carrying the random access preamble and the random access payload of the random access message, where the signaling includes system information signaling or radio resource control signaling, or both.

Some examples of the method, apparatuses, and non-transitory computer-readable medium described herein may further include operations, features, means, or instructions for determining the association between the one or more beams carrying the synchronization signal blocks and the one or more additional beams carrying the random access preamble and the random access payload of the random access message based on a physical random access channel occasion index of the one or more physical random access channel occasions, where the indication includes the physical random access channel occasion index.

Some examples of the method, apparatuses, and non-transitory computer-readable medium described herein may further include operations, features, means, or instructions for determining the association between the one or more beams carrying the synchronization signal blocks and the one or more additional beams carrying the random access preamble and the random access payload of the random access message based on a preamble sequence of the random access preamble, where the indication includes the preamble sequence.

Some examples of the method, apparatuses, and non-transitory computer-readable medium described herein may further include operations, features, means, or instructions for determining the association between the one or more beams carrying the synchronization signal blocks and the one or more additional beams carrying the random access preamble and the random access payload of the random access message based on a physical uplink shared channel resource unit index associated with the one or more physical uplink shared channel resource units of the random access payload, where the indication includes the physical uplink shared channel resource unit index.

Some examples of the method, apparatuses, and non-transitory computer-readable medium described herein may further include operations, features, means, or instructions for determining the association between the one or more beams carrying the synchronization signal blocks and the one or more additional beams carrying the random access preamble and the random access payload of the random access message based on multiplexing uplink control information on one or more of the random access preamble and the random access payload of the random access message, where the indication includes the multiplexing of the uplink control information.

In some examples of the method, apparatuses, and non-transitory computer-readable medium described herein, the random access preamble and the random access payload of the random access message may be associated with different synchronization signal blocks of the synchronization signal blocks based on a duration of a guard period associated with the random access preamble and a gap period between the random access preamble and the random access payload.

Some examples of the method, apparatuses, and non-transitory computer-readable medium described herein may further include operations, features, means, or instructions for determining that one or more physical uplink shared channel resource units of the random access payload share one or more of time resources and frequency resources, and determining a mapping between the one or more physical uplink shared channel resource units of the random access payload sharing one or more of the time resources and the frequency resources and a synchronization signal block of the synchronization signal blocks or a portion of synchronization signal blocks of the synchronization signal blocks, where the portion of synchronization signal blocks of the synchronization signal blocks may be grouped.

In some examples of the method, apparatuses, and non-transitory computer-readable medium described herein, determining the mapping between the one or more physical uplink shared channel resource units of the random access payload sharing one or more of the time resources and the frequency resources, and the synchronization signal block of the synchronization signal blocks or the portion of synchronization signal blocks of the synchronization signal blocks may include operations, features, means, or instructions for mapping the one or more physical uplink shared channel resource units of the random access payload sharing one or more of the time resources and the frequency resources to the synchronization signal block of the synchronization signal blocks based on an analog beam forming capability.

In some examples of the method, apparatuses, and non-transitory computer-readable medium described herein, determining the mapping between the one or more physical uplink shared channel resource units of the random access payload sharing one or more of the time resources and the frequency resources, and the synchronization signal block of the synchronization signal blocks or the portion of synchronization signal blocks of the synchronization signal blocks may include operations, features, means, or instructions for mapping the one or more physical uplink shared channel resource units of the random access payload sharing one or more of the time resources and the frequency resources to the portion of synchronization signal blocks of the synchronization signal blocks based on a digital beam forming capability.

Some examples of the method, apparatuses, and non-transitory computer-readable medium described herein may further include operations, features, means, or instructions for determining that the one or more physical random access channel occasions of the random access preamble may be shared with one or more additional random access preambles of a four-step random access procedure based on a UE capability, a random access procedure fallback capability, a load balancing capability, or a multiplexing of connection-free random access and contention-based random access, or any combination thereof.

Some examples of the method, apparatuses, and non-transitory computer-readable medium described herein may further include operations, features, means, or instructions for determining that a number of synchronization signal blocks satisfies a threshold, and determining that the random access preamble of the random access message of the two-step random access procedure and a random access message of a four-step random access procedure may be configured with different subsets of preamble sequences.

In some examples of the method, apparatuses, and non-transitory computer-readable medium described herein, an index of preamble sequences in each subset of the subsets of preamble sequences may be consecutive.

Some examples of the method, apparatuses, and non-transitory computer-readable medium described herein may further include operations, features, means, or instructions for preambling sequences in each subset of the subsets of preamble sequences may be nonoverlapping.

In some examples of the method, apparatuses, and non-transitory computer-readable medium described herein, the random access preamble of the random access message of the two-step random access procedure and the random access message of the four-step random access procedure may have a same receive beam.

Some examples of the method, apparatuses, and non-transitory computer-readable medium described herein may further include operations, features, means, or instructions for determining that the number of synchronization signal blocks may be greater than a threshold, where the number of synchronization signal blocks may be mapped to same physical random access channel occasions of the one or more physical random access channel occasions shared between the random access preamble of the two-step random access procedure and a random access message of a four-step random access procedure.

In some examples of the method, apparatuses, and non-transitory computer-readable medium described herein, the number of synchronization signal blocks may have different transmit beams.

In some examples of the method, apparatuses, and non-transitory computer-readable medium described herein, the random access preamble of the two-step random access procedure and the random access message of the four-step random access procedure may be mapped to different synchronization signal blocks of the number of synchronization signal blocks.

In some examples of the method, apparatuses, and non-transitory computer-readable medium described herein, a portion of the number of synchronization signal blocks mapped to the random access preamble of the two-step random access procedure may be one or more of consecutive in time domain or nonconsecutive in the time domain.

Some examples of the method, apparatuses, and non-transitory computer-readable medium described herein may further include operations, features, means, or instructions for transmitting beams mapped to the random access preamble of the two-step random access procedure and the random access message of the four-step random access procedure may have a same or different preamble sequence size based on a spatial separation of the transmit beams mapped to the random access preamble of the two-step random access procedure and the random access message of the four-step random access procedure.

In some examples of the method, apparatuses, and non-transitory computer-readable medium described herein, the random access preamble of the random access message of the two-step random access procedure and the random access message of the four-step random access procedure may have different receive beams.

In some examples of the method, apparatuses, and non-transitory computer-readable medium described herein, performing the two-step random access procedure may include operations, features, means, or instructions for transmitting the random access message of the two-step random access procedure during an association pattern period to the base station, and retransmitting the random access message of the two-step random access procedure during the association pattern period based on a retransmission counter being less than a threshold.

Some examples of the method, apparatuses, and non-transitory computer-readable medium described herein may further include operations, features, means, or instructions for performing a beam switch of the one or more additional beams carrying the random access preamble or the random access payload of the random access message, or both.

Some examples of the method, apparatuses, and non-transitory computer-readable medium described herein may further include operations, features, means, or instructions for determining a change in a physical random access channel occasion index of the one or more physical random access channel occasions, and where performing the beam switch of the one or more additional beams carrying the random access preamble or the random access payload of the random access message, or both may be based on the change in the physical random access channel occasion index.

Some examples of the method, apparatuses, and non-transitory computer-readable medium described herein may further include operations, features, means, or instructions for determining a change in a physical uplink shared channel resource unit index associated with the one or more physical uplink shared channel resource units of the random access payload, and where performing the beam switch of the one or more additional beams carrying the random access preamble or the random access payload of the random access message, or both may be based on the change in the physical uplink shared channel resource unit index associated with the one or more physical uplink shared channel resource units of the random access payload.

Some examples of the method, apparatuses, and non-transitory computer-readable medium described herein may further include operations, features, means, or instructions for determining a change in a preamble sequence index of the random access preamble, and where performing the beam switch of the one or more additional beams carrying the random access preamble or the random access payload of the random access message, or both may be based on the change in the random access preamble.

Some examples of the method, apparatuses, and non-transitory computer-readable medium described herein may further include operations, features, means, or instructions for determining to multiplex uplink control information on one or more of the random access preamble and the random access payload of the random access message, and where performing the beam switch of the one or more additional beams carrying the random access preamble or the random access payload of the random access message, or both may be based on multiplexing the uplink control information on one or more of the random access preamble and the random access payload of the random access message.

Some examples of the method, apparatuses, and non-transitory computer-readable medium described herein may further include operations, features, means, or instructions for performing the beam switch of the one or more additional beams carrying the random access preamble or the random access payload of the random access message, or both jointly with an additional beam switch by the base station of the one or more beams carrying the synchronization signal blocks.

In some examples of the method, apparatuses, and non-transitory computer-readable medium described herein, the beam switch may be enabled based on one or more of the association, the mapping, or a trigger indication including one or more of a preamble sequence, a reference signal, or uplink control information.

Some examples of the method, apparatuses, and non-transitory computer-readable medium described herein may further include operations, features, means, or instructions for performing a random access fallback procedure or a random access switch procedure from the two-step random access procedure to a four-step random access procedure, where performing the beam switch may be based on the random access fallback procedure or the random access switch procedure.

Some examples of the method, apparatuses, and non-transitory computer-readable medium described herein may further include operations, features, means, or instructions for identifying a random access message of the four-step random access procedure based on the random access fallback procedure or the random access switch procedure, where performing the beam switch may be based on control signaling including a downlink control information from the base station, the beam switch including a switch of one or more of a transmit beam and a receive beam.

Some examples of the method, apparatuses, and non-transitory computer-readable medium described herein may further include operations, features, means, or instructions for identifying a random access message of the four-step random access procedure based on the random access fallback procedure or the random access switch procedure, where performing the beam switch may be based on pre-configuration information including the association.

Some examples of the method, apparatuses, and non-transitory computer-readable medium described herein may further include operations, features, means, or instructions for resourcing of the transmitting the random access message of the two-step random access procedure during an association pattern period to the base station may be same resources of the retransmitting the random access message of the two-step random access procedure during the association pattern period based on the retransmission counter satisfying the threshold.

Some examples of the method, apparatuses, and non-transitory computer-readable medium described herein may further include operations, features, means, or instructions for resourcing of the transmitting the random access message of the two-step random access procedure during an association pattern period to the base station may be different from resources of the retransmitting the random access message of the two-step random access procedure during the association pattern period based on the retransmission counter satisfying the threshold.

A method of wireless communication at a base station is described. The method may include determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

An apparatus for wireless communication at a base station is described. The apparatus may include a processor, memory coupled with the processor, and instructions stored in the memory. The instructions may be executable by the processor to cause the apparatus to determine a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

Another apparatus for wireless communication at a base station is described. The apparatus may include means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

A non-transitory computer-readable medium storing code for wireless communication at a base station is described. The code may include instructions executable by a processor to determine a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

Some examples of the method, apparatuses, and non-transitory computer-readable medium described herein may further include operations, features, means, or instructions for mapping resources of the synchronization signal blocks to one or more physical random access channel occasions of the random access preamble and one or more physical uplink shared channel resource units of the random access payload over physical random access channel configuration periods of an association pattern period of the two-step random access procedure.

In some examples of the method, apparatuses, and non-transitory computer-readable medium described herein, transmitting the information to the user equipment may include operations, features, means, or instructions for transmitting signaling including the information including one or more of the mapping between the synchronization signal blocks and the random access message of the two-step random access procedure and the association between the one or more beams carrying the synchronization signal blocks and the one or more additional beams carrying the random access preamble and the random access payload of the random access message, where the signal includes system information signaling or radio resource control signaling, or both.

In some examples of the method, apparatuses, and non-transitory computer-readable medium described herein, the random access preamble and the random access payload of the random access message may be associated with different synchronization signal blocks of the synchronization signal blocks based on a duration of a guard period associated with the random access preamble and a gap period between the random access preamble and the random access payload.

Some examples of the method, apparatuses, and non-transitory computer-readable medium described herein may further include operations, features, means, or instructions for determining that one or more physical uplink shared channel resource units of the random access payload share one or more of time resources and frequency resources, and determining a mapping between the one or more physical uplink shared channel resource units of the random access payload sharing one or more of the time resources and the frequency resources and a synchronization signal block of the synchronization signal blocks or a portion of synchronization signal blocks of the synchronization signal blocks, where the portion of synchronization signal blocks of the synchronization signal blocks may be grouped.

In some examples of the method, apparatuses, and non-transitory computer-readable medium described herein, determining the mapping between the one or more physical uplink shared channel resource units of the random access payload sharing one or more of the time resources and the frequency resources and the synchronization signal block of the synchronization signal blocks or the portion of synchronization signal blocks of the synchronization signal blocks may include operations, features, means, or instructions for mapping the one or more physical uplink shared channel resource units of the random access payload sharing one or more of the time resources and the frequency resources to the synchronization signal block of the synchronization signal blocks based on an analog beam forming capability.

In some examples of the method, apparatuses, and non-transitory computer-readable medium described herein, determining the mapping between the one or more physical uplink shared channel resource units of the random access payload sharing the time resources and the synchronization signal block of the synchronization signal blocks or the portion of synchronization signal blocks of the synchronization signal blocks may include operations, features, means, or instructions for mapping the one or more physical uplink shared channel resource units of the random access payload sharing the time resources to the portion of synchronization signal blocks of the synchronization signal blocks based on a digital beam forming capability.

Some examples of the method, apparatuses, and non-transitory computer-readable medium described herein may further include operations, features, means, or instructions for determining that the number of synchronization signal blocks satisfies a threshold, and determining that the random access preamble of the random access message of the two-step random access procedure and a random access message of a four-step random access procedure may have a same receive beam and may be configured with different subsets of preamble sequences.

Some examples of the method, apparatuses, and non-transitory computer-readable medium described herein may further include operations, features, means, or instructions for determining that the number of synchronization signal blocks may be greater than a threshold, where the number of synchronization signal blocks may be mapped to same physical random access channel occasions of one or more physical random access channel occasions shared between the random access preamble of the two-step random access procedure and a random access message of a four-step random access procedure.

In some examples of the method, apparatuses, and non-transitory computer-readable medium described herein, the number of synchronization signal blocks may have different transmit beams.

In some examples of the method, apparatuses, and non-transitory computer-readable medium described herein, the random access preamble of the two-step random access procedure and the random access message of the four-step random access procedure may be mapped to different synchronization signal blocks of the number of synchronization signal blocks.

In some examples of the method, apparatuses, and non-transitory computer-readable medium described herein, a portion of the number of synchronization signal blocks mapped to the random access preamble of the two-step random access procedure may be one or more of consecutive in time domain or nonconsecutive in the time domain.

In some examples of the method, apparatuses, and non-transitory computer-readable medium described herein, the random access preamble of the random access message of the two-step random access procedure and the random access message of the four-step random access procedure may have different receive beams.

Some examples of the method, apparatuses, and non-transitory computer-readable medium described herein may further include operations, features, means, or instructions for performing a beam switch of the one or more additional beams carrying the random access preamble or the random access payload of the random access message, or both, where the one or more additional beams includes receive beams.

Some examples of the method, apparatuses, and non-transitory computer-readable medium described herein may further include operations, features, means, or instructions for performing a beam switch of the one or more additional beams carrying the random access preamble or the random access payload of the random access message, or both jointly with a beam switch of the one or more beams carrying the synchronization signal blocks, where the one or more additional beams includes receive beams and the one or more beams carrying the synchronization signal blocks includes transmit beams.

Some examples of the method, apparatuses, and non-transitory computer-readable medium described herein may further include operations, features, means, or instructions for performing a random access fallback procedure or a random access switch procedure from the two-step random access procedure to a four-step random access procedure, where performing the beam switch may be based on the random access fallback procedure or the random access switch procedure.

Some examples of the method, apparatuses, and non-transitory computer-readable medium described herein may further include operations, features, means, or instructions for identifying a random access message of the four-step random access procedure based on the random access fallback procedure or the random access switch procedure, and transmitting control signaling including downlink control information to the user equipment, where performing the beam switch may be based on the control signaling, the beam switching including a switch of one or more of a transmit beam and a receive beam.

A method of wireless communication is described. The method may include a processor, memory coupled with the processor, instructions stored in the memory and executable by the processor to cause the apparatus to, determining, based on the mapping, an association between one or more beams carrying the synchronization signal blocks and one or more additional beams carrying the random access preamble and the random access payload of the random access message, and performing the two-step random access procedure with a base station.

An apparatus for wireless communication is described. The apparatus may include a processor, memory coupled with the processor, and instructions stored in the memory. The instructions may be executable by the processor to cause the apparatus to a processor, memory coupled with the processor, instructions stored in the memory and executable by the processor to cause the apparatus to, determine, based on the mapping, an association between one or more beams carrying the synchronization signal blocks and one or more additional beams carrying the random access preamble and the random access payload of the random access message, and perform the two-step random access procedure with a base station.

Another apparatus for wireless communication is described. The apparatus may include means for a processor, memory coupled with the processor, instructions stored in the memory and executable by the processor to cause the apparatus to, determining, based on the mapping, an association between one or more beams carrying the synchronization signal blocks and one or more additional beams carrying the random access preamble and the random access payload of the random access message, and performing the two-step random access procedure with a base station.

A non-transitory computer-readable medium storing code for wireless communication is described. The code may include instructions executable by a processor to a processor, memory coupled with the processor, instructions stored in the memory and executable by the processor to cause the apparatus to, determine, based on the mapping, an association between one or more beams carrying the synchronization signal blocks and one or more additional beams carrying the random access preamble and the random access payload of the random access message, and perform the two-step random access procedure with a base station.

A method of wireless communication is described. The method may include a processor, memory coupled with the processor, instructions stored in the memory and executable by the processor to cause the apparatus to, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

An apparatus for wireless communication is described. The apparatus may include a processor, memory coupled with the processor, and instructions stored in the memory. The instructions may be executable by the processor to cause the apparatus to a processor, memory coupled with the processor, instructions stored in the memory and executable by the processor to cause the apparatus to, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

Another apparatus for wireless communication is described. The apparatus may include means for a processor, memory coupled with the processor, instructions stored in the memory and executable by the processor to cause the apparatus to, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

A non-transitory computer-readable medium storing code for wireless communication is described. The code may include instructions executable by a processor to a processor, memory coupled with the processor, instructions stored in the memory and executable by the processor to cause the apparatus to, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

A method of wireless communication is described. The method may include means for determining a mapping between synchronization signal blocks and a random access message of a two-step random access procedure based on an indication, the random access message including a random access preamble and a random access payload, means for determining, based on the mapping, an association between one or more beams carrying the synchronization signal blocks and one or more additional beams carrying the random access preamble and the random access payload of the random access message, and means for performing the two-step random access procedure with a base station.

An apparatus for wireless communication is described. The apparatus may include a processor, memory coupled with the processor, and instructions stored in the memory. The instructions may be executable by the processor to cause the apparatus to means for determining a mapping between synchronization signal blocks and a random access message of a two-step random access procedure based on an indication, the random access message including a random access preamble and a random access payload, means for determining, based on the mapping, an association between one or more beams carrying the synchronization signal blocks and one or more additional beams carrying the random access preamble and the random access payload of the random access message, and means for performing the two-step random access procedure with a base station.

Another apparatus for wireless communication is described. The apparatus may include means for means for determining a mapping between synchronization signal blocks and a random access message of a two-step random access procedure based on an indication, the random access message including a random access preamble and a random access payload, means for determining, based on the mapping, an association between one or more beams carrying the synchronization signal blocks and one or more additional beams carrying the random access preamble and the random access payload of the random access message, and means for performing the two-step random access procedure with a base station.

A non-transitory computer-readable medium storing code for wireless communication is described. The code may include instructions executable by a processor to means for determining a mapping between synchronization signal blocks and a random access message of a two-step random access procedure based on an indication, the random access message including a random access preamble and a random access payload, means for determining, based on the mapping, an association between one or more beams carrying the synchronization signal blocks and one or more additional beams carrying the random access preamble and the random access payload of the random access message, and means for performing the two-step random access procedure with a base station.

A method of wireless communication is described. The method may include means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, means for transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and means for performing the two-step random access procedure with the user equipment according to the mapping.

An apparatus for wireless communication is described. The apparatus may include a processor, memory coupled with the processor, and instructions stored in the memory. The instructions may be executable by the processor to cause the apparatus to means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, means for transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and means for performing the two-step random access procedure with the user equipment according to the mapping.

Another apparatus for wireless communication is described. The apparatus may include means for means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, means for transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and means for performing the two-step random access procedure with the user equipment according to the mapping.

A non-transitory computer-readable medium storing code for wireless communication is described. The code may include instructions executable by a processor to means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, means for transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and means for performing the two-step random access procedure with the user equipment according to the mapping.

A method of wireless communication at a user equipment, the code including instructions executable by a processor to is described. The method may include determining a mapping between synchronization signal blocks and a random access message of a two-step random access procedure based on an indication, the random access message including a random access preamble and a random access payload, determining, based on the mapping, an association between one or more beams carrying the synchronization signal blocks and one or more additional beams carrying the random access preamble and the random access payload of the random access message, and performing the two-step random access procedure with a base station.

An apparatus for wireless communication at a user equipment, the code including instructions executable by a processor to is described. The apparatus may include a processor, memory coupled with the processor, and instructions stored in the memory. The instructions may be executable by the processor to cause the apparatus to determine a mapping between synchronization signal blocks and a random access message of a two-step random access procedure based on an indication, the random access message including a random access preamble and a random access payload, determine, based on the mapping, an association between one or more beams carrying the synchronization signal blocks and one or more additional beams carrying the random access preamble and the random access payload of the random access message, and perform the two-step random access procedure with a base station.

Another apparatus for wireless communication at a user equipment, the code including instructions executable by a processor to is described. The apparatus may include means for determining a mapping between synchronization signal blocks and a random access message of a two-step random access procedure based on an indication, the random access message including a random access preamble and a random access payload, determining, based on the mapping, an association between one or more beams carrying the synchronization signal blocks and one or more additional beams carrying the random access preamble and the random access payload of the random access message, and performing the two-step random access procedure with a base station.

A non-transitory computer-readable medium storing code for wireless communication at a user equipment, the code including instructions executable by a processor to is described. The code may include instructions executable by a processor to determine a mapping between synchronization signal blocks and a random access message of a two-step random access procedure based on an indication, the random access message including a random access preamble and a random access payload, determine, based on the mapping, an association between one or more beams carrying the synchronization signal blocks and one or more additional beams carrying the random access preamble and the random access payload of the random access message, and perform the two-step random access procedure with a base station.

A method of wireless communication at a base station, the code including instructions executable by a processor to is described. The method may include determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

An apparatus for wireless communication at a base station, the code including instructions executable by a processor to is described. The apparatus may include a processor, memory coupled with the processor, and instructions stored in the memory. The instructions may be executable by the processor to cause the apparatus to determine a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

Another apparatus for wireless communication at a base station, the code including instructions executable by a processor to is described. The apparatus may include means for determining a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmitting information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and performing the two-step random access procedure with the user equipment according to the mapping.

A non-transitory computer-readable medium storing code for wireless communication at a base station, the code including instructions executable by a processor to is described. The code may include instructions executable by a processor to determine a mapping between synchronization signal blocks and a random access message of a two-step random access procedure, the random access message including a random access preamble and a random access payload, and the mapping including an association between one or more beams carrying the synchronization signal blocks and one or more additional beams carrying the random access preamble and the random access payload of the random access message, transmit information to a user equipment including one or more of the mapping between the synchronization signal blocks and the random access message of the two-step random access procedure and the association between the one or more beams carrying the synchronization signal blocks and the one or more additional beams carrying the random access preamble and the random access payload of the random access message, and perform the two-step random access procedure with the user equipment according to the mapping.

DETAILED DESCRIPTION

Figure 1:
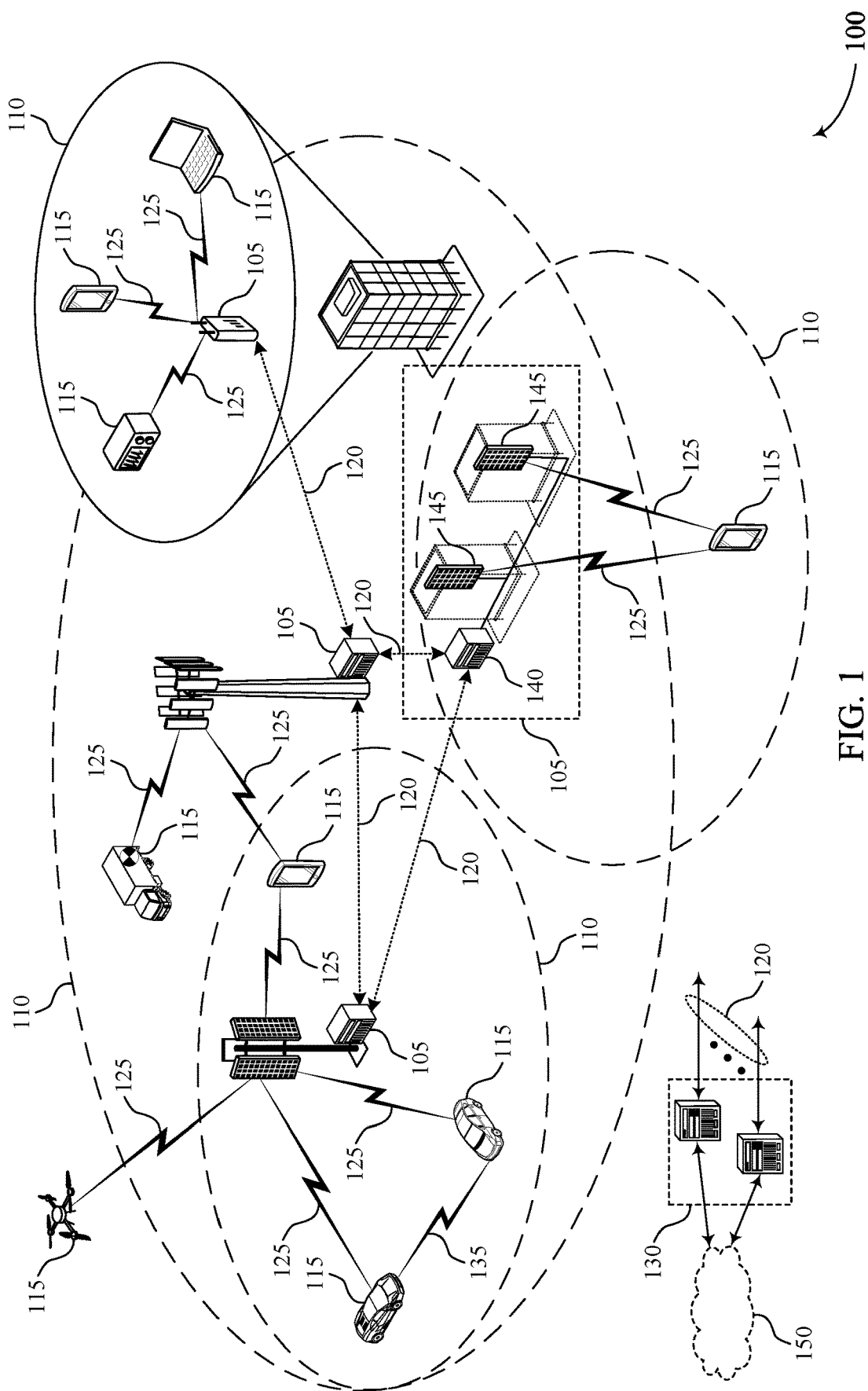
FIG. 1 illustrates an example of a system for wireless communications that supports beam association in random access procedures in accordance with aspects of the present disclosure.

Some wireless communication systems may have a user equipment (UE) and a base station (e.g., eNodeB (eNB), a next-generation NodeB or giga-NodeB (either of which may be referred to as a gNB)) establish a connection using a random access procedure. The random access procedure may include a series of handshake messages carrying information that facilitates establishing the connection between the UE and the base station. In some examples, a random access procedure may be a two-step random access procedure, which may reduce latency compared to other random access procedures that use a greater number of handshake messages, such as a four-step random access procedure. Additionally, the UE may fallback from a two-step random access procedure to a four-step random access procedure when the two-step random access procedure is unsuccessful or due to some other condition (e.g., priority, traffic load). Because the base station and the UE may support multiple random access procedures (e.g., two-step and four-step random access procedures) and multibeam implementations, the base station may configure transmission of random access messages, such to enable the UE the capability to differentiate between random access messages of different types of random access procedures (e.g., two-step and four-step random access procedures), as well as enable beam association, as described herein.

A UE may be configured to determine a mapping between synchronization signal blocks (SSBs) and a random access message, for example, relating to a two-step random access procedure. The UE may also determine an association between one or more respective directional beams carrying the SSBs and one or more additional respective directional beams carrying the random access message (e.g., a random access preamble and a random access payload of the random access message). Additionally, the described techniques may include, in some examples, mapping time and frequency resources of the SSBs to one or more physical random access channel (PRACH) occasions (ROs) of the random access preamble and one or more physical uplink shared channel (PUSCH) resource units (PRUs) of the random access payload over PRACH configuration periods of an association pattern period of the two-step random access procedure. Additionally or alternatively, the described techniques may include beam association for a random access fallback procedure and a random access switch procedure.

Particular aspects of the subject matter described herein may be implemented to realize one or more advantages. The described techniques may support improvements in power savings, among other advantages. As such, supported techniques may include improved UE operations and, in some examples, may promote UE efficiencies, among other benefits. Aspects of the disclosure are initially described in the context of a wireless communications system. Aspects of the disclosure are then illustrated by and described with reference to mapping configurations, transmit chains, channel structures, and process flows that relate to beam association in random access procedures. Aspects of the disclosure are further illustrated by and described with reference to apparatus diagrams, system diagrams, and flowcharts that relate to beam association in random access procedures.

FIG. 1 illustrates an example of a wireless communications system 100 that supports beam association in random access procedures in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like. The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs. Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

A base station 105 may determine a mapping between SSBs and a random access message of a two-step random access procedure, the random access message including a random access preamble and a random access payload, and the mapping may include an association between one or more beams carrying the SSBs and one or more additional beams carrying the random access preamble and the random access payload of the random access message. The base station 105 may transmit information to a UE 115 including one or more of the mapping between the SSBs and the random access message of the two-step random access procedure and the association between the one or more beams carrying the SSBs and the one or more additional beams carrying the random access preamble and the random access payload of the random access message.

A UE 115 may determine a mapping between SSBs and a random access message, for example, relating to a two-step random access procedure. The UE 115 may also determine an association between one or more respective directional beams carrying the SSBs and one or more additional respective directional beams carrying the random access message (e.g., a random access preamble and a random access payload of the random access message). Additionally, the described techniques may include, in some examples, mapping time and frequency resources of the SSBs to one or more ROs of the random access preamble and one or more PRUs of the random access payload over PRACH configuration periods of an association pattern period of the two-step random access procedure. Additionally or alternatively, the described techniques may include beam association for a random access fallback procedure and a random access switch procedure.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
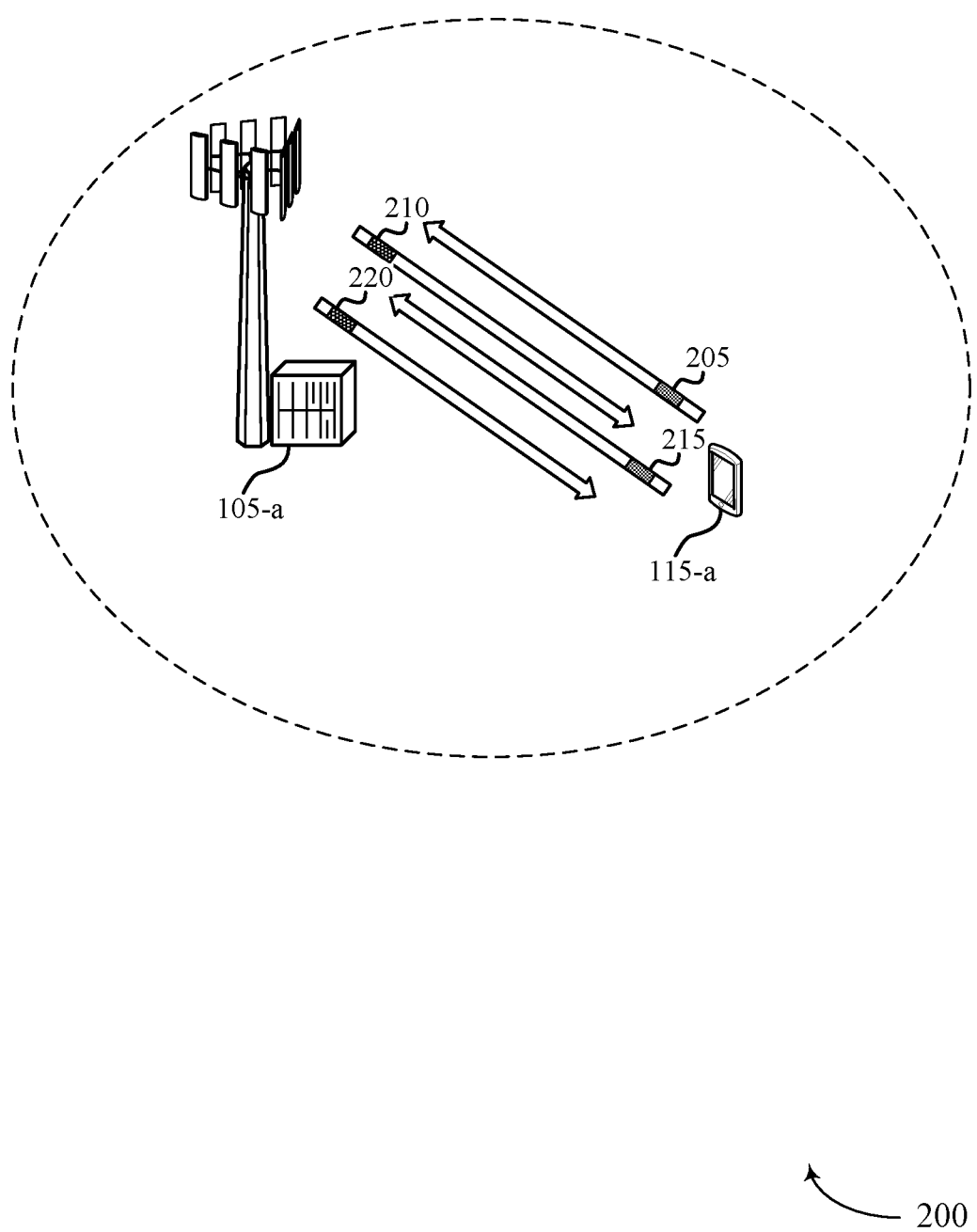
FIG. 2 illustrates an example of a wireless communications system that supports a four-step random access procedure in accordance with aspects of the present disclosure.

FIG. 2 illustrates an example of a wireless communications system 200 that supports a four-step random access procedure in accordance with various aspects of the present disclosure. The wireless communications system 200 may include a base station 105-a and a UE 115-a, which may be examples of the corresponding devices described with reference to FIG. 1. In some examples, the wireless communications system 200 may implement aspects of the wireless communications system 100. For example, the base station 105-a and the UE 115-a may support robustness for beam association and improvement in random access messaging, among other advantages.

The base station 105-a may perform a connection procedure (e.g., an RRC procedure, such as a cell acquisition procedure or a random access procedure) with the UE 115-a. For example, the base station 105-a and the UE 115-a may perform a random access procedure to establish a connection for communication. In other examples, the base station 105-a and the UE 115-a may perform a random access procedure to re-establish a connection after a connection failure (e.g., a radio-link failure) with the base station 105-a, or to establish a connection for handover to another base station, or the like. The base station 105-a and the UE 115-a may also support multiple radio access technologies including 4G systems such as LTE systems, LTE-A systems, or LTE-A Pro systems, and 5G systems which may be referred to as NR systems.

A connection procedure (e.g., a random access procedure) between the base station 105-a and the UE 115-a may correspond to, for example, at least one of the above example radio access technologies. By way of example, in FIG. 2, a random access procedure may be related to 4G systems and may be referred to as a four-step random access procedure. As part of the four-step random access procedure, the base station 105-a and the UE 115-a may transmit one or more messages (e.g., one or more handshake messages), such as a random access message 205 (also referred to herein as msg1), a random access message 210 (also referred to herein as msg2), a random access message 215 (also referred to herein as msg3), and a random access message 220 (also referred to herein as msg4).

In FIG. 2, a random access procedure may commence with the UE 115-a transmitting the random access message 205, which may include a preamble (also referred to as a random access channel (RACH) preamble, a physical random access channel (PRACH) preamble, or a sequence) that may carry information, such as a UE identifier. The purpose of the preamble transmission may be to provide an indication to the base station 105-a presence of a random access attempt, and to allow the base station 105-a to determine a delay (e.g., a timing delay) between the base station 105-a and the UE 115-a. The UE 115-a may transmit the random access message 205 to the base station 105-a on a PRACH, for example.

In some examples, prior to a connection procedure between the base station 105-a and the UE 115-a, such as a four-step random access procedure, the base station 105-a may transmit a synchronization signal block (SSB), a system information block (SIB), a reference signal (e.g., a demodulation reference signal (DMRS)), or a combination thereof to indicate configuration information to the UE 115-a for performing the four-step random access procedure. Some examples of a random access procedure, such as a four-step random access procedure may be contention-based or contention-free. To transmit random access messages and initiate a random access procedure, the UE 115-a may first identify information, such as synchronization information, for the base station 105-a and some system information for the wireless communications system 200. The base station 105-a may transmit (e.g., periodically) synchronization information and system information in one or more of an SSB and a SIB, respectively. In some examples, the synchronization information and system information may be transmitted in an SSB and a physical broadcast channel (PBCH) block (e.g., an SS/PBCH block also referred to as an SSB). The base station 105-a may transmit a reference signal, such as a DMRS on a PBCH to assist the UE 115-a in decoding an SSB and synchronizing with the base station 105-a.

An SSB may include some synchronization information or signaling that the UE 115-a may use to synchronize downlink communications from the base station 105-a. For example, an SSB may include a primary synchronization signal (PSS), a secondary synchronization signal (SSS), and a PBCH. A PBCH may include a master information block (MIB), which may include information indicating a location of a SIB, or multiple SIBs. In some examples, a SIB of a PBCH (e.g., a SIB1) may include information, such as a RACH or PRACH configuration, regarding transmission opportunities (e.g., resources in time and frequency) for the UE 115-a to transmit, receive, or both, signaling for the random access procedure.

When performing a contention-based random access (CBRA) procedure, the base station 105-a may configure the UE 115-a with an SSB to PRACH occasion (RO) association. A RO may be defined as time and frequency resources on which the UE 115-a may transmit, on a respective directional beam, a random access message in a random access procedure, such as a msg1 of a four-step random access message using a configured PRACH preamble format. The association may be between a respective directional beam carrying an SSB and a respective directional beam carrying a msg1 of a four-step random access procedure over an RO.

The UE 115-a may receive, from the base station 105-a, a number (N) of SSBs associated within a single RO and a number (R) of contention-based preambles per SSB per valid RO, where N and R are positive values. For example, the UE 115-a may be provided N SS/PBCH blocks associated with one RO and R contention-based preambles per SS/PBCH block by a higher layer parameter. In some examples, when N is less than a threshold, for example N<1, then one SS/PBCH block may be mapped to a fraction of consecutive SSBs for consecutive valid ROs (e.g., 1/N consecutive valid ROs). Alternatively, when N is greater than or equal to a threshold, for example, N≥1, then N SS/PBCH blocks may be mapped to one valid RO. If N≥1, R contention-based preambles with consecutive indexes associated with SS/PBCH block N, mapping per RO may begin from an initial preamble index. In some examples, SS/PBCH block indexes may be mapped to ROs based in part on an order, for example, an increasing order of preamble indexes within a single RO, increasing order of frequency resource indexes for frequency multiplexed ROs, or increasing order of time resource indexes for time multiplexed ROs. The base station 105-a and the UE 115-a may map SSBs to one or more ROs during one or more PRACH configuration periods of an association pattern period. The association pattern period may be defined based on the one or more PRACH configuration periods.

An association pattern period, starting from an initial frame (e.g., a frame 0), for mapping SS/PBCH blocks to ROs may be a value in a set determined by a PRACH configuration period according to Table 1, such that SS/PBCH blocks are mapped at least once to the ROs within an association pattern period. Table 1 may therefore illustrate a mapping between a PRACH configuration period and SS/PBCH blocks to RO association pattern periods (e.g., a number of PRACH configuration periods).

TABLE 1

Mapping between PRACH configuration periods and SS/PBCH block to RO association pattern period

| PRACH configuration period (msec) | Association pattern period (number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

In some examples, if after an integer number of SS/PBCH blocks to ROs mapping cycles within an association pattern period has a set of ROs that are not mapped to N SS/PBCH blocks, no SS/PBCH blocks may be mapped to the set of ROs. In some examples, an association pattern period may include one or more association pattern periods and may be determined so that a pattern between ROs and SS/PBCH blocks repeats, for example, every 160 msec. ROs not associated with SS/PBCH blocks after an integer number of association pattern periods, if any, may not be used for PRACH transmissions. Mapping between PRACH configuration periods and SS/PBCH blocks to a RO association pattern period is further described in more detail herein with reference to FIG. 3.

Figure 3:
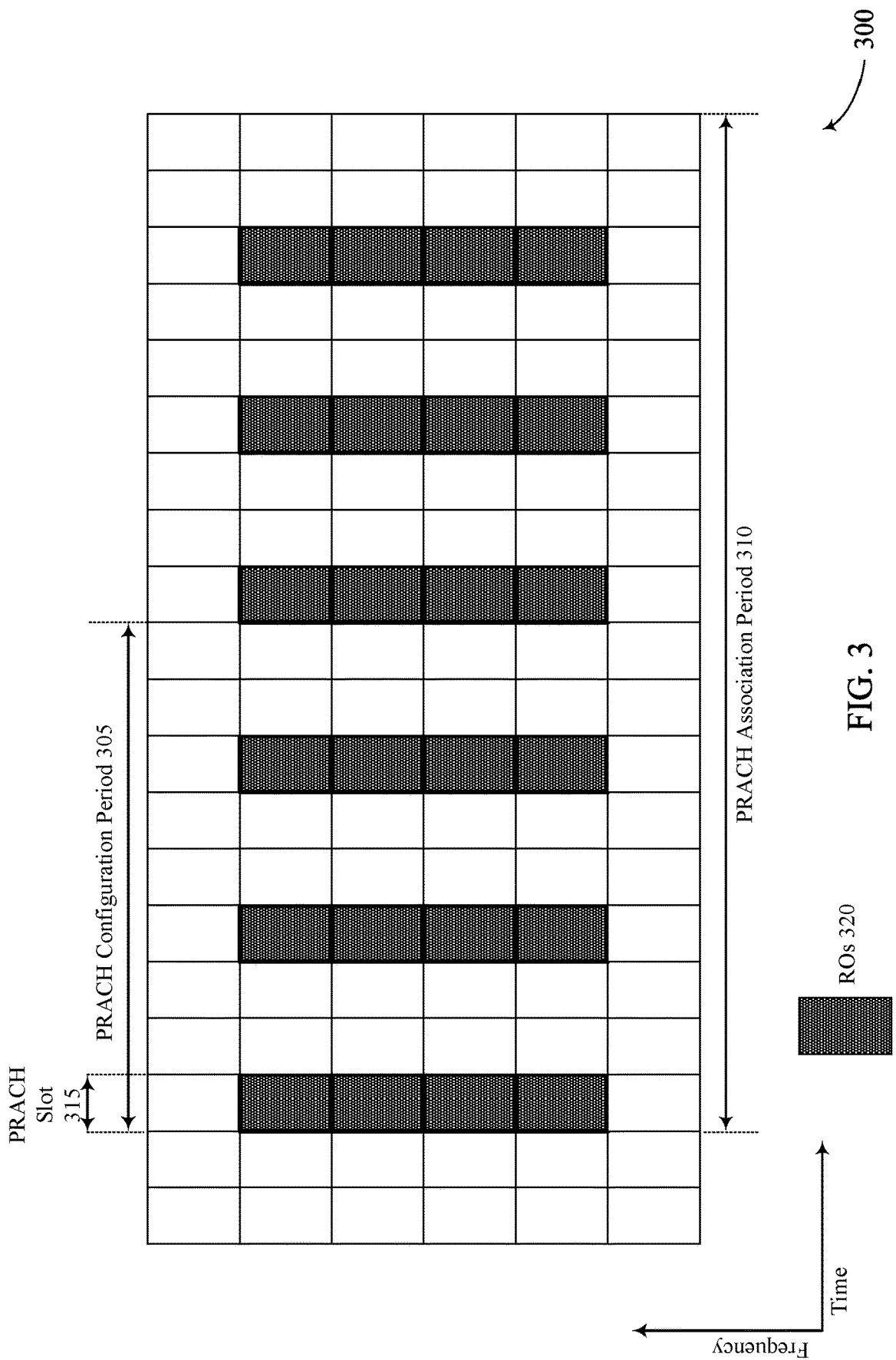
FIG. 3 illustrates an example of a mapping configuration that supports mapping between one or more physical random access channel (PRACH) configuration periods and an association pattern period in accordance with aspects of the present disclosure.

FIG. 3 illustrates an example of a mapping configuration 300 that supports mapping between one or more PRACH configuration periods and an association pattern period in accordance with various aspects of the present disclosure. The mapping configuration 300 may implement aspects of the wireless communications systems 100 and 200, as described with reference to FIGS. 1 and 2. For example, the mapping configuration 300 may be based on a configuration by a base station 105, and implemented by a UE 115 for mapping between one or more PRACH configuration periods and an association pattern period to support robustness for beam association and improvement in random access messaging, among other advantages, as described herein.

The mapping configuration 300 may include a PRACH configuration period 305 that may be part of a PRACH association pattern period 310 for SSB to RO mapping. The PRACH configuration period 305 may include a number of ROs 320. In some examples, two or more ROs 320 may be frequency division multiplexed. For example, a PRACH slot 315 of the PRACH configuration period 305 may have a number of ROs 320 that may be frequency division multiplexed. In the example of FIG. 3, four ROs 320 may be frequency division multiplexed. In some examples, the PRACH configuration period 305 may include a number of periodic frequency division multiplexed ROs 320. For example, every MPRACH slot 315 may include a number of frequency division multiplexed ROs 320, where M is a positive value.

In some examples, the mapping configuration 300 may be based on an entry of the Table 1, as described in FIG. 2. An entry of the Table 1 may be based on a higher layer parameter, for example, such as one or more of a msg1-FDM and ssb-perRACH-OccasionAndCB-PreamblesPerSSB. For example, a base station 105 may transmit high layer parameters to a UE 115 in a SIB, such as SIB 1. Therefore, according to the mapping configuration 300, a UE 115 and base station 105 may map SSBs to ROs to support robustness for beam association and improvement in random access messaging.

Returning to FIG. 2, a preamble of the random access message 205 may, in some examples, be defined by a preamble sequence and a cyclic prefix. A preamble sequence may be defined based in part on a Zadoff-Chu sequence. The UE 115-a may additionally, or alternatively, use a guard period to handle timing uncertainty of the random access message 205 transmission. For example, before beginning the random access procedure, the UE 115-a may obtain downlink synchronization with the base station 105-a based on a cell-search procedure. However, because the UE 115-a has not yet obtained uplink synchronization with the base station 105-a, there may be an uncertainty in uplink timing due to the location of the UE 115-a in the cell (e.g., a geographic coverage area of the base station 105-a) not being known. In some examples, the uncertainty in uplink timing may be based in part on a dimension (e.g., size, area) of the cell. Therefore, including a cyclic prefix to the random access message 205 may be beneficial, in some examples, for handling the uncertainty in uplink timing.

Per cell, there may be a number of preamble sequences (e.g., 64 preamble sequences). The UE 115-a may select a preamble sequence from a set of sequences in a cell (e.g., a geographic coverage area of the base station 105-a) based in part on a randomness selection. In some examples, the UE 115-a may select a preamble sequence based in part on an amount of traffic that the UE 115-a has for transmission on an uplink shared channel (UL-SCH). From the preamble sequence that the UE 115-a selected, the base station 105-a may determine the amount of uplink resources to be granted to the UE 115-a.

Some examples of a random access procedure may be contention-based or contention-free. When performing a CBRA procedure, the UE 115-a may select a preamble sequence from a set of sequences. That is, as long as other UEs (not shown) are not performing a random access attempt using the same sequence at a same temporal instance, no collisions will occur, and the random access attempt may be detected by the base station 105-a. If the UE 115-a is performing a contention-free random access (CFRA) attempt, for example, for a handover to a new cell, the preamble sequence to use may be explicitly signaled (e.g., in control information) by the base station 105-a. To avoid collisions or interference, the base station 105-a may select a contention-free preamble sequence from sequences not associated with the contention-based random access attempt.

Upon receiving the random access message 205, the base station 105-a may respond appropriately with a random access message 210. For example, the base station 105-a may transmit the random access message 210 to the UE 115-a on a downlink shared channel (DL-SCH) or a physical downlink control channel (PDCCH). In some examples, the random access message 210 may have a same or a different configuration compared to the random access message 205. The random access message 210 may carry information for the UE 115-*a*, where the information is determined by the base station 105-*a* based on information carried in the random access message 205. For example, the information in the random access message 210 may include an index of a preamble sequence detected and for which the response is valid, a timing advance parameter determined based in part on the preamble sequence detected, a scheduling grant indicating time and frequency resources for the UE 115-*a* to use for transmission of a next random access message transmission by the UE 115-*a*, or a network identifier (e.g., a random access radio network temporary identifier (RA-RNTI)) for further communication with the UE 115-*a*, or the like.

In some examples, the base station 105-*a* may transmit the random access message 210, which may be scheduled on a PDCCH using an identity reserved for random access messaging, for example, an RA-RNTI. The UE 115-*a* may monitor the PDCCH to detect and receive a random access message (e.g., the random access message 210). In some examples, the UE 115-*a* may monitor the PDCCH for a random access message transmission from the base station 105-*a* during a random access response window, which may be fixed or variable in size. For example, if the UE 115-*a* does not detect and receive a random access message transmission from the base station 105-*a*, the random access attempt may be declared as a failure and the random access procedure in FIG. 2 may repeat. However, in the subsequent attempt, the random access response window may be adjusted (e.g., increased or decreased in length (duration)).

Once the UE 115-*a* successfully receives the random access message 210, the UE 115-*a* may obtain uplink synchronization with the base station 105-*a*. In some examples, before data transmission from the UE 115-*a*, a unique identifier within the cell (e.g., a cell RNTI (C-RNTI)) may be assigned to the UE 115-*a*. In some examples, depending on a state (e.g., an RRC connected state, an RRC ideal state) of the UE 115-*a* there may be a need for additional message (e.g., a connection request message) exchange for setting up the connection between the base station 105-*a* and the UE 115-*a*. The UE 115-*a* may transmit any necessary messages, for example, the random access message 215 to the base station 105-*a* using UL-SCH resources (or PUSCH resources) assigned in the random access message 210. The random access message 210 may include a UE identifier for contention resolution. If the UE 115-*a* is in an RRC connected state, for example, the UE identifier may be a C-RNTI. Otherwise, the UE identifier may be specific to the UE 115-*a*.

The base station 105-*a* may receive the random access message 215 and may respond properly, for example, by transmitting the random access message 220, which may be a contention resolution message. When multiple UEs (including UE 115-*a*) are performing simultaneously random access attempts using a same preamble sequence, these UEs may result in listening for a same response message (e.g., the random access message 220). Each UE (including the UE 115-*a*) may receive the random access message 220 and compare an identifier (e.g., network identifier) in the random access message 220 to the identifier specified in the random access message 215. When the identifiers match, the corresponding UE (e.g., the UE 115-*a*) may declare the random access procedure successful. UEs that do not identify a match between the identifiers are considered to have failed the random access procedure and may repeat the random access procedure with the base station 105-*a*. As a result of the connection procedure, the base station 105-*a* and the UE 115-*a* may establish a connection for communication.

Although, the connection procedure (e.g., random access procedure) in FIG. 2 may be effective for facilitating random access for the UE 115-*a*, there may be unnecessary latencies associated with this procedure. For example, latencies related to contention-based protocol of random access messaging may exhaust additional resources of the UE 115-*a*. The techniques described herein may provide efficacy to the UE 115-*a* by reducing or eliminating latencies associated with processes related to initial channel access.

Figure 4:
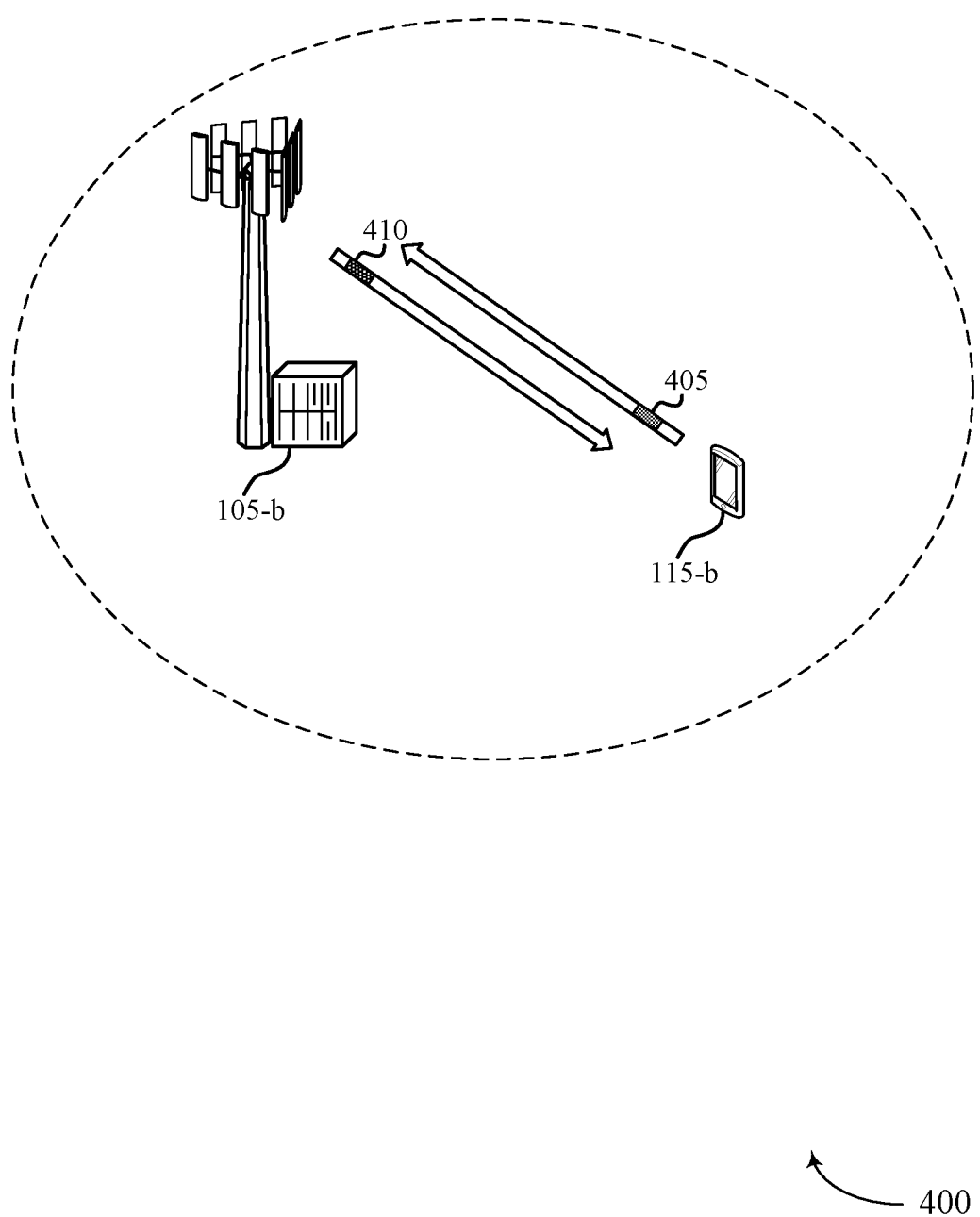
FIG. 4 illustrates an example of a wireless communications system that supports a two-step random access procedure in accordance with aspects of the present disclosure.

FIG. 4 illustrates an example of a wireless communications system 400 that supports a two-step random access procedure in accordance with various aspects of the present disclosure. The wireless communications system 400 may include a base station 105-*b* and a UE 115-*b*, which may be examples of the corresponding devices described with reference to FIG. 1. In some examples, the wireless communications system 400 may implement aspects of the wireless communications systems 100 and 200. For example, the base station 105-*b* and the UE 115-*b* may support robustness for beam association and improvement in random access messaging, among other advantages.

The base station 105-*b* and the UE 115-*b* may, as explained with reference to FIG. 2, support multiple radio access technologies including 4G systems such as LTE systems, LTE-A systems, or LTE-A Pro systems, and 5G systems which may be referred to as NR systems. A connection procedure (e.g., a random access procedure) between the base station 105-*b* and the UE 115-*b* may correspond to, for example, at least one of these example radio access technologies. In the example of FIG. 4, a random access procedure may be related to 5G systems and may be referred to as a two-step random access procedure. As part of a two-step random access procedure, to decrease latencies related to contention-based aspects of the two-step random access procedure, the base station 105-*b* and the UE 115-*b* may exchange fewer messages (e.g., handshake messages) compared to a four-step random access procedure, as explained in FIG. 2.

For example, the UE 115-*b* may transmit a single message, such as a random access message 405 (also referred to herein as msgA), and the base station 105-*b* may transmit a single message, such as a random access response message 410 (also referred to herein as msgB) in response to the random access message 405. The random access message 405 (e.g., msgA) may combine parts of msgs1,3 of a four-step random access procedure, while the random access response message 410 (e.g., msgB) may combine aspects of msgs2,4 of a four-step random access procedure. When supporting both two-step and four-step random access procedures, it may be important for the UE 115-*b* to be configured to support beam association for both random access procedures.

When supporting both two-step and four-step random access procedures, the base station 105-*b* and the UE 115-*b* may commence with one random access procedure (e.g., a two-step random access procedure) and fallback to another random access procedure (e.g., a four-step random access procedure), if needed. The base station 105-*b* may select or assign a priority to a random access procedure based on a condition (e.g., a traffic type, a network load). For example, the base station 105-*b* may configure to use a four-step random access procedure over a two-step random access procedure for certain scenarios (e.g., a traffic load, a link quality measurement, a system load, a quality of service (QoS), etc.) to reduce an overhead because the base station 105-b may have to provision for msgA resources for two-step random access that may involve a larger overhead compared to msg1 transmissions with a four-step random access procedure. Additionally or alternatively, the base station 105-b may select a random access procedure based on the UE 115-b capability to support the random access procedure. For example, if the UE 115-b supports both two-step and four-step random access procedures, the base station 105-b may select the two-step random access procedure or the four-step random access procedure to commence the initial access procedure. Otherwise, the base station 105-b may select the random access procedure supported by the UE 115-b.

Returning to the example of random access messaging, the UE 115-b may transmit the random access message 405 to the base station 105-b. The random access message 405 may include a random access preamble and a random access payload (e.g., a physical uplink shared channel (PUSCH) carrying a payload), where information in the random access message 405 (e.g., msgA) includes the equivalent contents or aspects of msg3 of a four-step random access procedure. The random access message 405 transmission in a two-step random access procedure is further described in more detail herein with reference to FIG. 5.

Figure 5:
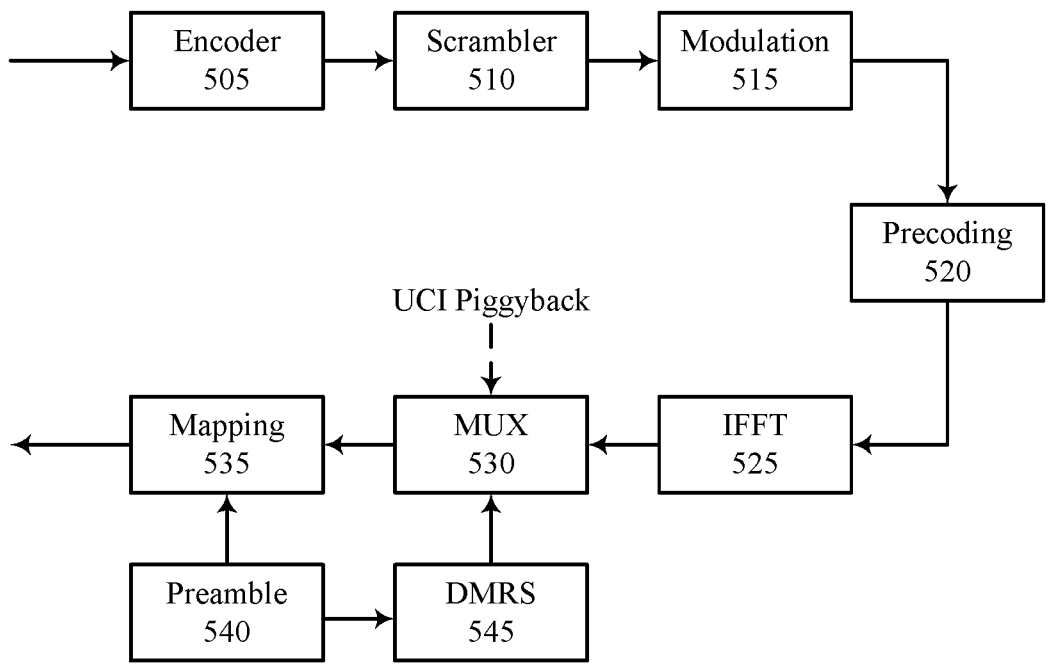
FIG. 5 illustrates an example of a transmit chain that supports a two-step random access procedure in accordance with various aspects of the present disclosure.

FIG. 5 illustrates an example of a transmit chain 500 that supports beam association in random access procedures in accordance with aspects of the present disclosure. In some examples, the transmit chain 500 may implement aspects of the wireless communications system 400. For example, with reference to FIG. 4, the transmit chain 500 may illustrate how the random access message 405 of the two-step random access procedure (e.g., msgA) is configured (e.g., encoded, scrambled, mapped, etc.) by the UE 115-b, prior to the UE 115-b transmitting the random access message 405 to the base station 105-b. The UE 115-b may use an encoder 505 for encoding a payload portion of the random access message 405. In some examples, the encoder 505 may be a low-density parity check (LDPC) encoder. After encoding the payload of the random access message 405, the UE 115-b may pass the payload through a scrambler 510, which may scramble the encoded bits. After scrambling the encoded bits, the UE 115-v may then perform modulation 515. In some examples, the modulation 515 may include a linear modulation.

Subsequently, the UE 115-b may perform a precoding 520 (e.g., transform precoding) on the modulated bits. The UE 115-b may then use an inverse fast Fourier transform (IFFT) 525 after precoding to transform the bits. After the IFFT 525, the UE 115-b may use a multiplexer (MUX) 530. In some examples, with the multiplexer 530, the UE 115-b may multiplex a DMRS 545 (e.g., in reference signal resources and using a DMRS sequence as described herein). Subsequently, the UE 115-b may perform a mapping 535. In some examples, the UE 115-b may perform the mapping as based on the preamble 540. For example, the preamble 540 may indicate one or more of a pre-defined mapping rule between a preamble and the payload, reference signal resources, and reference signal sequence, of the random access message 405. In some examples, the mapping may include mapping of time, frequency, and space (e.g., beam, panel) resources. The preamble 540 may supply an early indication of user plane data, control plane data, medium access control (MAC) control element (CE) (MAC CE) (e.g., including a buffer status report (BSR) or a power headroom report (PHR)), payload size, and an uplink control information (UCI) piggyback on a PUSCH. The UE 115-b may then transmit the random access message 405 after performing the different steps.

Returning to FIG. 4, an advantage of the two-step random access procedure compared to the four-step random access procedure may be that the UE 115-b may be capable of transmitting data (e.g., a random access payload on a PUSCH) to the base station 105-b without having to be in an RRC connected state for one data transmission. The base station 105-b may monitor a PUSCH for a random access preamble or a random access payload of the random access message 405. In some examples, the base station 105-b may determine an absence of the random access preamble or the random access payload of the random access message 405 based on the monitoring. Absence of the random access preamble or the random access payload of the random access message 405 may result in a random access procedure failure.

In some examples, after successfully receiving the random access message 405, the base station 105-b may construct and transmit the random access response message 410 to the UE 115-b. For example, the base station 105-b may transmit the random access response message 410 to the UE 115-b on a DL-SCH, PDSCH, PDCCH. The random access response message 410 may include at least one of a network identifier of the UE 115-b, a timing advance parameter, and a backoff indication for the UE 115-b. The backoff indication may include a timing backoff indication or a random access procedure backoff indication, or both. The timing backoff indication may be associated with a timing of reattempting the random access procedure (e.g., a two-step random access procedure) and the random access procedure backoff indication may be associated with switching from a present random access procedure to an alternative random access procedure (e.g., a four-step random access procedure).

In an example of multibeam implementation of a random access procedure, for example, such as a two-step random access procedure, transmission of a random access preamble on a PRACH and transmission of a PUSCH carrying a random access payload may occur over one or more occasions. For example, transmission of a random access preamble on a PRACH may occur over a RO, which may include time and frequency resources. In other examples, transmission of a PUSCH carrying a random access payload may occur over a PO, which may include time and frequency resources (e.g., a PURSH resource unit (PRU) including PUSCH resources and DMRS resources).

One or more occasions may share a relationship. In some examples, ROs and POs may have a one one-to to-one mapping. For example, a single RO may map to a single respective PO. In some other examples, ROs and POs may have a one to many mappings. For example, a single RO may map to several POs. Alternatively, multiple ROs may map to a single PO using a many to one mapping. The UE 115-b may multiplex a transmission of a random access preamble over time and frequency resources of multiple ROs. Similarly, it may be advantageous for the UE 115-b to multiplex a transmission of a PUSCH carrying a random access payload over time and frequency resources of multiple POs.

In some examples, when supporting both two-step and four-step random access procedures, the base station 105-b may be capable to configure separate ROs for a two-step random access procedure and a four-step random access procedure. Alternatively, the base station 105-b may be capable of configuring shared ROs but configure (use) separate preambles for a two-step random access procedure and a four-step random access procedure to avoid interference issues. In some examples, when supporting both two-step and four-step random access procedures, the base station 105-*b* and the UE 115-*b* may configure beam establishment during initial access for a two-step random access procedure for improved coverage and interference mitigation.

In some examples, when supporting both two-step and four-step random access procedures, the base station 105-*b* and the UE 115-*b* may be capable of beam switching for random access message retransmission (e.g., msgA retransmission) and fallback to a different random access procedure (e.g., from a two-step random access procedure to a four-step random access procedure). In order to improve beam establishment reliability for different random access procedure (e.g., a two-step random access procedure) and reduce complexity in the wireless communications system 400, the base station 105-*b* and the UE 115-*b* may support resource configuration and signaling support for beam association between SSB and random access messaging resources (e.g., msgA RO and msgA PRU). One or more SSBs and one or more ROs may share a relationship. In some examples, SSBs and ROs may have a one one-to to-one mapping. For example, a single SSB may map to a single respective RO. In some other examples, SSBs and ROs may have a one to many mappings. For example, a single SSB may map to several ROs. Alternatively, multiple SSBs may map to a single RO using a many to one mapping. The base station 105-*b* may multiplex a transmission of an SSB over time and frequency resources of multiple ROs. Similarly, respective directional beams associated with SSBs may have a relationship (association) with respective directional beams associated with ROs (and/or POs).

The base station 105-*b* and the UE 115-*b* may, in some examples, map SS/PBCH blocks to ROs according to Table 2, which may implement aspects of Table 1 such that SS/PBCH blocks are mapped at least once to the ROs within an association pattern period in two-step random access procedures. Table 2 may therefore illustrate a mapping capability between a PRACH configuration period and SS/PBCH blocks to RO association pattern period for both two-step and four-step random access procedures. In some examples, an association pattern period of a two-step random access procedure may be a multiple of an association pattern period of a four-step random access procedure (e.g., two-step random access procedure association pattern period $\triangleq$ K*four-step random access procedure association pattern period, where K≥1 and K is an integer).

TABLE 2

Mapping between PRACH configuration periods and SS/PBCH block to RO association pattern period

| PRACH configuration period (msec) | Association pattern period in four-step random access procedure (number of PRACH configuration periods) | Association pattern period in two-step random access procedure (number of PRACH configuration periods) |
| --- | --- | --- |
| 10 | {1, 2, 4, 8, 16} | {1, 2, 4, 8, 16} |
| 20 | {1, 2, 4, 8} | {1, 2, 4, 8} |
| 40 | {1, 2, 4} | {1, 2, 4} |
| 80 | {1, 2} | {1, 2} |
| 160 | {1} | {1} |

Figure 6A:
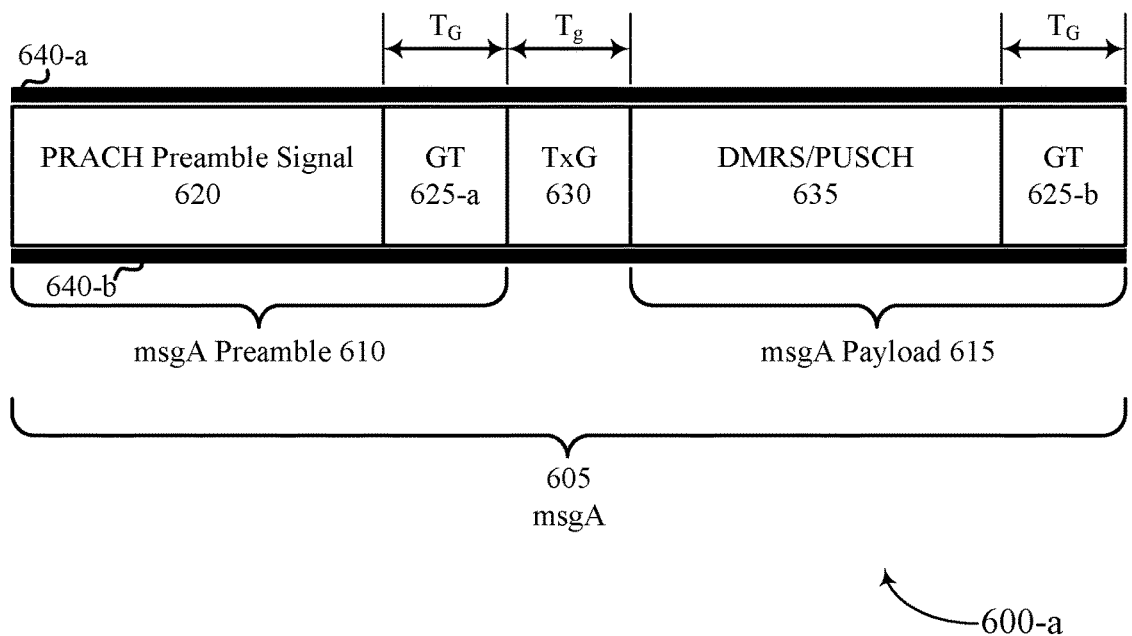
FIG. 6A illustrates an example of a channel structure that supports beam association in random access procedures in accordance with aspects of the present disclosure.
Figure 6B:
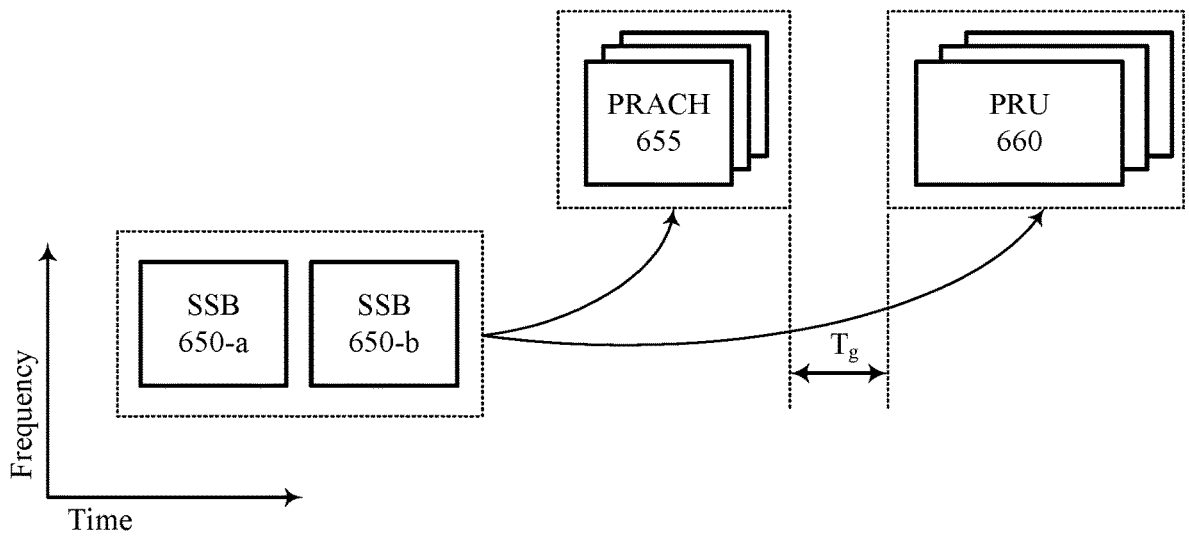
FIG. 6B illustrates an example of a mapping configuration that supports between beam association in random access procedures in accordance with aspects of the present disclosure.

Resource configuration and signaling support for beam association between SSB and random access messaging resources is further described in more detail herein with reference to FIGS. 6A and 6B.

FIG. 6A illustrates an example of a channel structure 600-*a* that supports beam association in random access procedures in accordance with aspects of the present disclosure. The channel structure 600-*a* may implement aspects of the wireless communications systems 100, 200, and 400. For example, the channel structure 600-*a* may support robustness for beam association and improvement in random access messaging, among other advantages, as described herein. A UE 115 may transmit a random access message 605 to a base station 105 according to the channel structure 600-*a*. The random access message 605 may represent a structure of a random access message for a two-step random access procedure (e.g., msgA) as described herein. The channel structure 600-*a* of the random access message 605 may support a CBRA procedure or a CFRA procedure on time and frequency resources.

The random access message 605 may include a random access preamble 610 and a random access payload 615. In some examples, a bandwidth for the random access preamble 610 and the random access payload 615 may be same or different. The random access preamble 610 may include a PRACH preamble signal 620, where the random access preamble 610 (e.g., with PRACH preamble signal 620) may serve multiple purposes. For example, the random access preamble 610 may facilitate timing offset estimation by a base station 105. Additionally, the random access preamble 610 may supply an early indication of payload size and resource allocation for the random access payload 615 (e.g., which may provide a more efficient solution than a UCI piggyback on a PUSCH that includes the random access payload 615).

In some examples, the resource allocation for the random access payload 615 may be based on a predefined mapping rule between the random access preamble 610 and the random access payload 615 that may be indicated in configuration information from a base station 105. The random access payload 615 may include a DMRS/PUSCH 635 portion for transmission of the random access payload 615 of the random access message 605. The random access payload 615 may include a configurable payload size for different use cases and RRC states. For example, the random access payload 615 may include a minimum payload size and may not include a maximum (e.g., upper bound) payload size. In some examples, the random access payload 615 may include data from one or more of a user plane and a control plane.

Additionally, between each portion of the random access message 605 (e.g., between the random access preamble 610 and the random access payload 615), a guard time (GT) 625 may exist. A first GT 625-*a* may exist between the random access preamble 610 and the random access payload 615, and a second GT 625-*b* may exist after the random access payload 615 and a subsequent random access preamble 610. Additionally, a base station 105 may also configure a transmission gap (e.g., TxG) 630 to extend the time between the random access preamble 610 and the random access payload 615. The transmission gap 630 may extend the random access message 605 to occur over more than one symbol (e.g., or different TTI length). In some examples, each GT 625 may have a duration equal to $T_G$, and the transmission gap 630 may have a duration equal to $T_g$. In some examples, a base station 105 may configure a guard band (GB) 640. For example, a base station 105 may configure a first GB 640-*a* and a second GB 640-*b* to mitigate inter symbol interference (ISI) or inter carrier interference (ICI) for asynchronous uplink communications.

FIG. 6B illustrates an example of a mapping configuration 600-*b* that supports beam association in random access procedures in accordance with aspects of the present disclosure. The mapping configuration 600-*b* may implement aspects of the wireless communications systems 100, 200, and 400. For example, the mapping configuration 600-*b* may support robustness for beam association and improvement in random access messaging, among other advantages, as described herein. A base station 105 may configure and a UE 115 may determine a mapping between SSBs 650 and one or more PRACH 655 of a random access preamble of a random access message (e.g., msgA) over one or more ROs, and one or more PRUs 660 of a random access payload of the random access message (e.g., msgA) based on a configuration by the base station 105.

Within an association pattern period, a base station 105 may configure slots including one or more PRACH 655 over one or more ROs and one or more random access payloads over one or more PRUs 660, etc. In some examples, a base station 105 may associate one or more SSBs 650 with one or more PRACH 655 and one or more PRUs 660 within a PRACH association pattern period (e.g., using a parameter association). For example, a first SSB 650-*a* may be associated with a first PRACH 655 and a first PRU 660, while a second SSB 650-*b* may be associated with a second PRACH 655 and a second PRU 660. In some examples, a UE 115 may determine, based on the mapping, an association between one or more respective directional beams carrying the SSBs 650 and one or more additional respective directional beams carrying the PRACH 655 (e.g., a random access preamble of a random access message (e.g., msg A)), as well as a random access payload of a random access message (e.g., msg A). In some examples, a base station 105 and a UE 115 may support different beam associations between SSB and random access message (e.g., msgA) of a two-step random access procedure.

In some examples, to support different beam association between an SSB and a msgA, a base station 105 may transmit configuration information for beam association to a UE 115 via SIB signaling or RRC signaling. A UE 115 may determine a beam association according to one or more factors. For example, a UE 115 may determine an association between one or more respective directional beams carrying SBBs 650 and one or more additional respective directional beams carrying the random access message (e.g., msgA) based in part on a RO index of one or more ROs. In some examples, a UE 115 may determine an association between one or more respective directional beams carrying SBBs 650 and one or more additional respective directional beams carrying the random access message (e.g., msgA) based in part on a preamble sequence of a random access preamble of the random access message (e.g., msgA). In some examples, a UE 115 may determine an association between one or more respective directional beams carrying SBBs 650 and one or more additional respective directional beams carrying the random access message (e.g., msgA) based in part on a PRU index associated with one or more PRUs. In some other examples, a UE 115 may determine an association between one or more respective directional beams carrying SBBs 650 and one or more additional respective directional beams carrying the random access message (e.g., msgA) based in part on UCI piggybacking a PUSCH. Thus, a UE 115 may determine a beam association according to one or more factors, such as a msgA RO index, msgA preamble sequence, msgA PRU index, and UCI piggyback.

A random access preamble and a random access payload of a random access message (e.g., msgA) of a two-step random access procedure may be associated with different SSBs 650. For example, with reference to FIG. 6A, when a sum of $T_g$ and $T_G$ (e.g., $T_g+T_G$) is greater than a threshold, a random access preamble and a random access payload of a random access message (e.g., msgA) of a two-step random access procedure may be associated with different SSBs 650. For example, with reference to FIGS. 6A and 6B, the random access preamble 610 (carried on a PRACH 655) may be associated with SSB 650-*a*, while the random access payload 615 (and a PRU 660) may be associated with SSB 650-*b*. In some examples, one or more PRUs 660 that share time domain resources may be grouped together and may be mapped to a same SSB 650 or a same subset of SSBs 650.

By way of example, a UE 115 may determine that the one or more PRUs 660 of a random access payload share time/frequency resources, and determine a mapping between the one or more PRUs 660 of the random access payload sharing the time/frequency resources and an SSB 650 of or a subset of SSBs of a set of SSBs 650. The subset of SSBs may be grouped. In some examples, a base station 105 and a UE 115 may map one or more PRUs 660 of a random access payload sharing time/frequency resources to one or more SSBs 650 based in part on an analog beam forming capability or a digital beam forming capability. For example, for analog beam forming, a base station 105 and a UE 115 may support mapping to single SSBs, while for digital beam forming, the base station 105 and the UE 115 may support mapping to more than one SSB.

Returning to FIG. 4, in some examples, the base station 105-*b* and the UE 115-*b* may support sharing ROs between multiple random access procedures. For example, the base station 105-*b* and the UE 115-*b* may support sharing ROs between a two-step random access procedure and a four-step random access procedure. In some examples, the base station 105-*b* may configure sharing of ROs between multiple random access procedures according to system information signaling or RRC signaling. The base station 105-*b* may determine to configure RO sharing between multiple random access procedures according to one or more conditions. For example, the base station 105-*b* may determine to configure RO sharing based on one or more of a UE capability of the UE 115-*b*, a random access procedure fallback capability of the UE 115-*b*, a load balancing capability (e.g., for more efficient RO sharing), or a multiplexing of CFRA and CBRA.

The UE 115-*b* may receive, from the base station 105-*b*, a number N of SSBs associated one or more shared ROs between multiple random access procedures. In some examples, mapping of SSBs to one or more shared ROs may be based on whether the number N of SSBs is equal to or greater than a threshold (e.g., N≥1). In some examples, a preamble sequence may vary between random access messages of multiple random access procedures. For example, when the number N of SSBs is equal to a threshold (e.g., N=1), a preamble sequence of a random access message (e.g., msgA) of a two-step random access procedure and a preamble sequence of a random access message (e.g., msg1) of a four-step random access procedure may be configured with two subsets of preamble sequences.

In some examples, the UE 115-*b* may determine that a number N of SSBs satisfies a threshold, and determine that a random access preamble of a random access message of a two-step random access procedure (e.g., msgA) and a random access message of a four-step random access procedure (e.g., msg1) are configured with different subsets of preamble sequences. In some examples, index of preamble sequences in each subset may be consecutive. The UE 115-*b* may therefore determine that an index of preamble sequences in each subset of the subsets of preamble sequences are consecutive (e.g., of msgA and msg1). In some examples, the preamble sequences in each subset may be nonoverlapping to avoid interference. Thus, the base station 105-*b* may use a same respective directional beam to receive both random access messages, for example, msgA associated with a two-step random access message and a msg1 associated with a four-step random access message. A beam association between SSB and random access messaging resources is further described in more detail herein with reference to FIG. 7A.

Figure 7A:
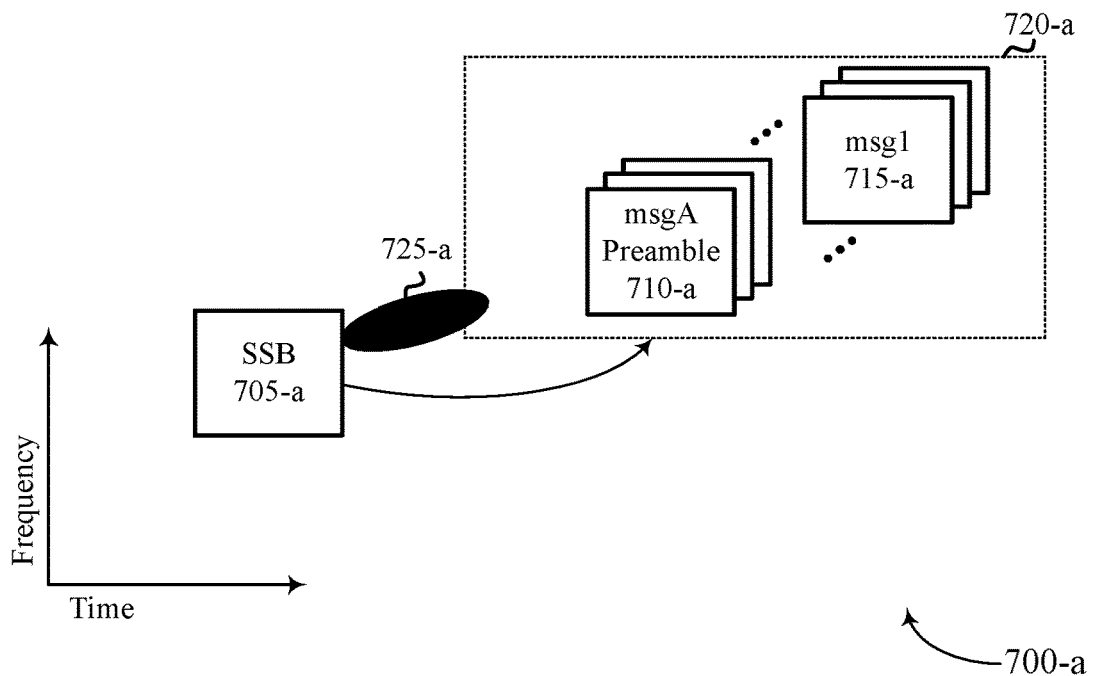
FIG. 7A illustrates an example of a mapping configuration that supports beam association in random access procedures in accordance with aspects of the present disclosure.

FIG. 7A illustrates an example of a mapping configuration 700-*a* that supports beam association in random access procedures in accordance with aspects of the present disclosure. The mapping configuration 700-*a* may implement aspects of the wireless communications systems 100, 200, and 400. For example, the mapping configuration 700-*a* may support robustness for beam association and improvement in random access messaging, among other advantages, as described herein. A base station 105 may transmit an SSB 705-*a* to a UE 115 on a same respective directional beam 725-*a*. The SSB 705-*a* may correspond to a random access preamble 710-*a* of a random access message (e.g., msgA) associated with a two-step random access procedure, and a random access message 715-*a* (e.g., msg1) associated with a four-step random access procedure. The random access preamble 710-*a* of the random access message (e.g., msgA) associated with the two-step random access procedure, and the random access message 715-*a* (e.g., msg1) associated with the four-step random access procedure may share an RO 720-*a*, and may be configured with different preamble sequences, as described herein. Thus, the base station 105 may also receive the random access preamble 710-*a* of the random access message (e.g., msgA) associated with the two-step random access procedure, and the random access message 715-*a* (e.g., msg1) associated with the four-step random access procedure from a UE 115 on a same respective directional beam because of the use of different preamble sequences, which may distinguish the transmissions.

Returning to FIG. 4, in some examples, the UE 115-*b* may determine that a number N of SSBs is above a threshold (e.g., N>1), and determine that a random access preamble of a random access message of a two-step random access procedure (e.g., msgA) and a random access message of a four-step random access procedure (e.g., msg1). In the example that a number N of SSBs is above a threshold, the base station 105-*b* may configure (e.g., map) the number N of SSBs to a same RO, which may be shared by the random access preamble of the random access message of a two-step random access procedure (e.g., msgA) and the random access message of the four-step random access procedure (e.g., msg1). In some examples, the base station 105-*b* may use different respective directional beams for the number N of SSBs. In some examples, the random access preamble of the random access message of a two-step random access procedure (e.g., msgA) and the random access message of the four-step random access procedure (e.g., msg1) may be mapped to different subsets of SSBs. The mapping to the subsets of SSBs may be consecutive or nonconsecutive in a time domain. In some examples, depending on a spatial separability of respective directional beams mapped to the random access message of a two-step random access procedure (e.g., msgA) and the random access message of the four-step random access procedure (e.g., msg1), a subset of preamble sequences associated with each respective directional beam may have similar of different sizes. The base station 105-*b* may employ different respective directional beams for receiving from the UE 115-*b* the random access message of a two-step random access procedure (e.g., msgA) and the random access message of the four-step random access procedure (e.g., msg1). A beam association between SSB and random access messaging resources is further described in more detail herein with reference to FIG. 7B.

Figure 7B:
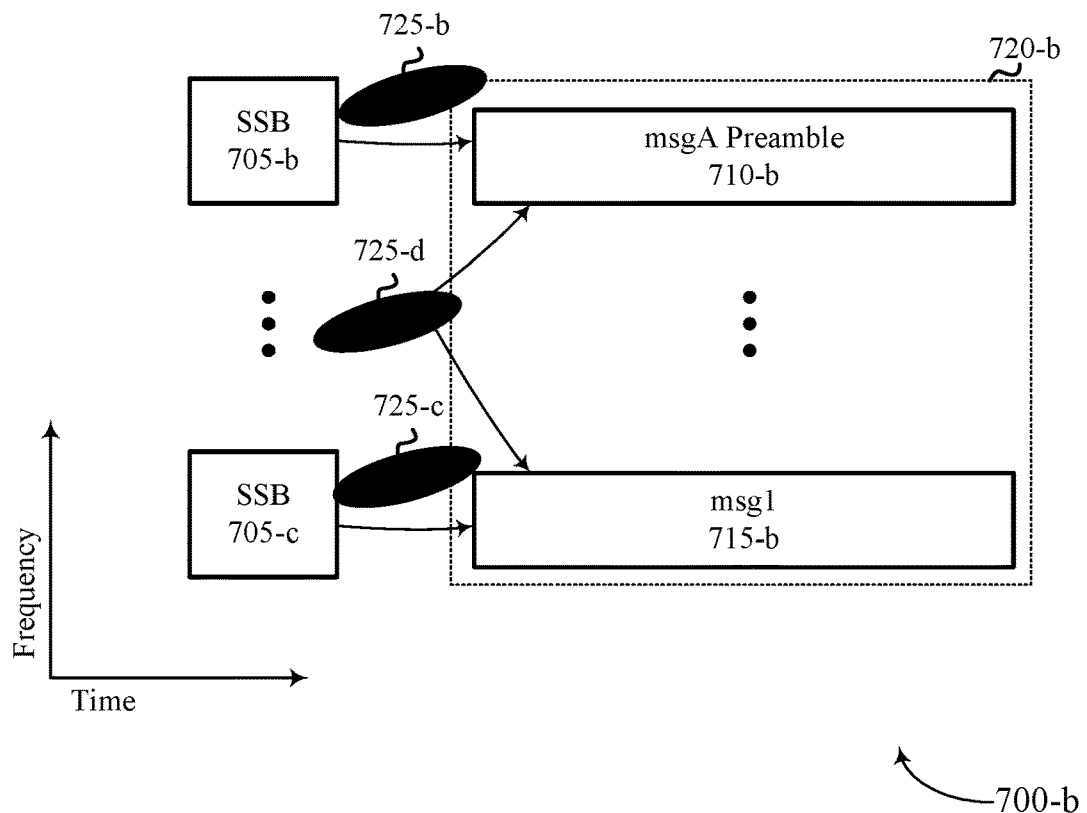
FIG. 7B illustrates an example of a mapping configuration that supports between beam association in random access procedures in accordance with aspects of the present disclosure.

FIG. 7B illustrates an example of a mapping configuration 700-*b* that supports beam association in random access procedures in accordance with aspects of the present disclosure. The mapping configuration 700-*b* may implement aspects of the wireless communications systems 100, 200, and 400. For example, the mapping configuration 700-*b* may support robustness for beam association and improvement in random access messaging, among other advantages, as described herein. A base station 105 may transmit different SSBs 705 on a same or different respective directional beam 725 to a UE 115-*b* when supporting multiple random access procedures. For example, a base station 105 may transmit an SSB 705-*b* on a respective directional beam 725-*b* corresponding to a random access preamble 710-*b* of a random access message associated with a two-step random access procedure, and transmit an SSB 705-*c* on a respective directional beam 725-*c* corresponding to a random access message 715-*b* associated with a four-step random access procedure. Alternatively, a base station 105 may transmit the SSB 705-*b* corresponding to the random access preamble 710-*b* of the random access message associated with the two-step random access procedure and the SSB 705-*c* corresponding to the random access message 715-*b* associated with the four-step random access procedure on a same respective directional beam 725-*d*. The random access preamble 710-*a* of the random access message (e.g., msgA) associated with the two-step random access procedure, and the random access message 715-*b* (e.g., msg1) associated with the four-step random access procedure may share an RO 720-*b*, and may be configured with different preamble sequences, as described herein. Thus, the base station 105 may also receive the random access preamble 710-*b* of the random access message (e.g., msgA) associated with the two-step random access procedure, and the random access message 715-*b* (e.g., msg1) associated with the four-step random access procedure from a UE 115 on a same respective directional beam because of the use of different preamble sequences, which may distinguish the transmissions.

Returning to FIG. 4, in some examples, within an association pattern period of a two-step random access procedure, the random access message 405 (e.g., a random access preamble and a random access payload of the random access message 405) may be retransmitted multiple times by the UE 115-*b*. In some examples, the UE 115-*b* may retransmit the random access message 405 as long as a retransmission counter is below a threshold (e.g., a maximum value configured by the base station 105-*b*). The base station 105-*b* and the UE 115-*b* may support a beam switch, for example, switching a respective directional beam (e.g., a receive beam of the base station 105-*b* and a transmit beam of the UE 115-*b*) for the random access message 405 retransmission. In some examples, the UE 115-*b* may support a beam switch (e.g., switching a transmit beam) to both a random access preamble of the random access message 405 and a random access payload of the random access message 405. Similarly, the base station 105-b may support a beam switch (e.g., switching a receive beam) for both a random access preamble of the random access message 405 and a random access payload of the random access message 405. In some examples, a beam switch (e.g., a transmit beam switch) may be indicated based on one or more conditions, for example, one or more of a change in a RO index, a change in a PRU index, a change in a preamble index of a random access preamble of the random access message 405, or UCI piggybacking on a PUSCH.

In some examples, based on an RRC state (e.g., RRC idle state, RRC inactive state), resources (e.g., pre-configured in time domain, frequency domain, space domain, code domains) used for a transmission and a retransmission of the random access message 405 can be different. For example, if the random access message 405 is allowed to be retransmitted M times within an association pattern period of the two-step random access procedure, when 1≤retx counter≤α·M, the UE 115-b may use resources in a first resource set X. Alternatively, when α·M+1≤re-tx counter≤M, the UE 115-b may use resources in a second resource set Y, where the first resource set is different from the second resource set. In some examples, for an RRC connected state, reference signals (e.g., channel state information (CSI) reference signals, sounding references signals) can be configured to assist with beam switching. In some examples, the base station 105-b and the UE 115-b may perform beam switching jointly (e.g., receive beam and transmit beam switching jointly). In some examples, the base station 105-b and the UE 115-b may enable beam switching based in part on an association rule between SSB and resources of the random access message 405 mapping, or triggered by a preamble, reference signal, or UCI.

The base station 105-b and the UE 115-b may support beam switching for a random access fallback procedure or a random access switch procedure from a two-step random access procedure to a four-step random access procedure. For example, when fallback for switch happens, the new transmission can start with msg1 or msg3 of four-step random access procedure. In some examples, beam switch may be enabled for the random access fallback procedure or the random access switch procedure. For example, when the new transmission starts with msg3 of a four-step random access procedure, the beam switching can be ordered via downlink control information (DCI) by the base station 105-b. Alternatively, when the new transmission starts with msg1 of a four-step random access procedure, the beam switching can be pre-configured based on the association rule between SSB and RO. The described techniques may therefore include features for improved resource usage and allocation for random access messaging, improved reliability for random access messaging and, in some examples, may promote low latency for random access procedures, among other benefits.

Figure 8:
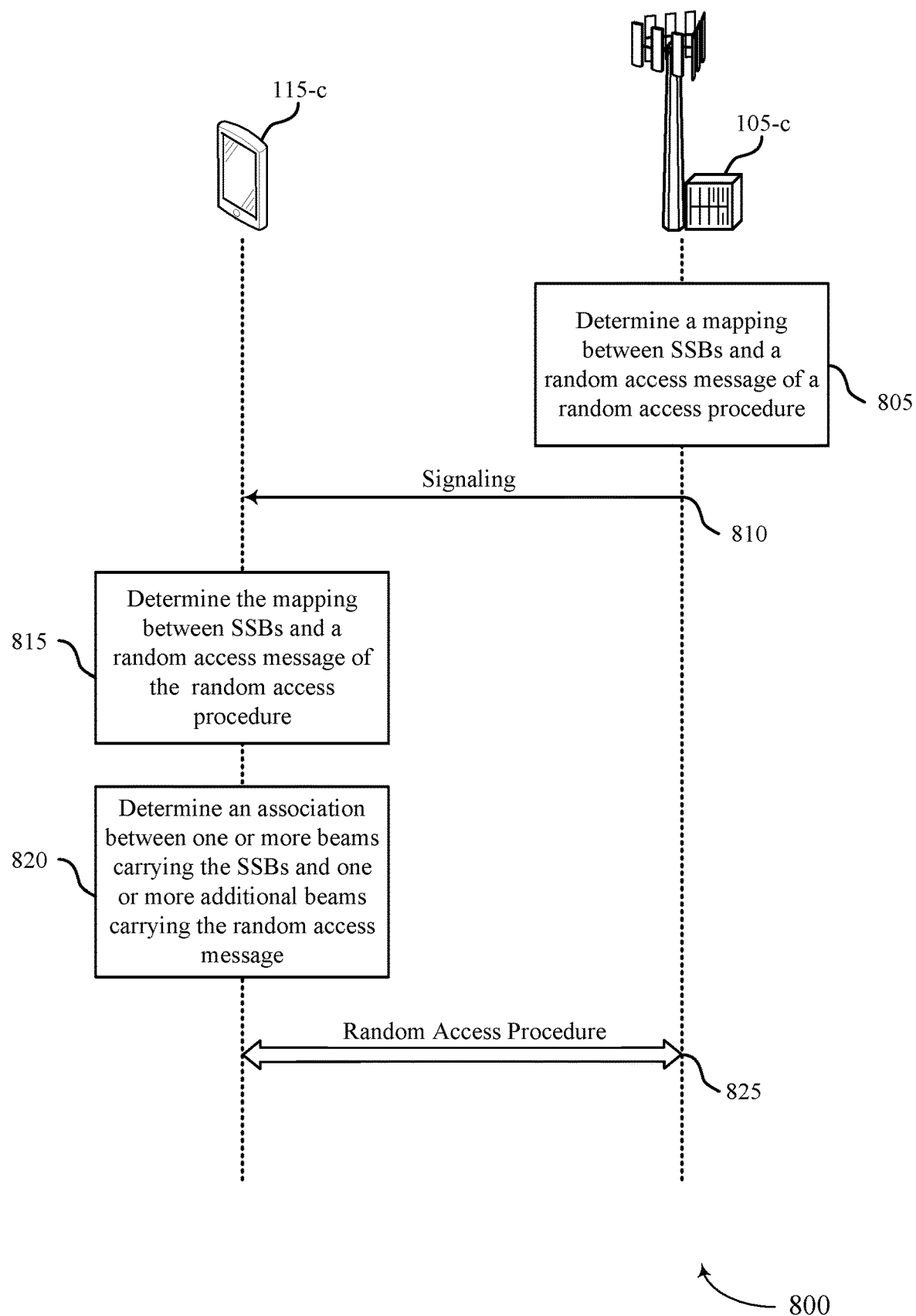
FIG. 8 illustrates an example of a process flow that supports beam association in random access procedures in accordance with aspects of the present disclosure.

FIG. 8 illustrates an example of a process flow 800 that supports beam association in random access procedures in accordance with aspects of the present disclosure. In some examples, the process flow 800 may implement aspects of the wireless communications systems 100, 200 and 400, as described with reference to FIGS. 1, 2 and 4. For example, the process flow 800 may include a base station 105-c and a UE 115-c, which may be examples of the corresponding devices described with reference to FIGS. 1 and 2. In the following description of the process flow 800, the operations between the base station 105-c and the UE 115-c may be transmitted in a different order than the example order shown, or the operations performed by the base station 105-c and the UE 115-c may be performed in different orders or at different times. Some operations may also be omitted from the process flow 800, and other operations may be added to the process flow 800. The operations performed by the base station 105-c and the UE 115-c may support improvement to the UE 415 resource usage and allocation for random access messaging, improved reliability for random access messaging and, in some examples, may promote low latency for random access procedures, among other benefits.

The process flow 800 may commence with the base station 105-c and the UE 115-c performing a random access procedure to establish a connection. The base station 105-c and the UE 115-c may support multiple radio access technologies including 4G systems such as LTE systems, LTE-A systems, or LTE-A Pro systems, and 5G systems which may be referred to as NR systems. The random access procedure may correspond to, for example, at least one of the above example radio access technologies. In FIG. 8, by way of example, the random access procedure may be a four-step random access procedure related to 4G systems or a two-step random access procedure related to 5G NR systems, or the like. Alternatively, the random access procedure occurs after one or more operations of the process flow 800.

At 805, the base station 105-c may determine a mapping between SSBs and a random access message of a random access procedure, for examples such as a two-step random access procedure. In some examples, the base station 105-c may, based in part on the mapping, determine an association between one or more beams carrying the SSBs and one or more additional beams carrying A random access preamble and A random access payload, for example, of a random access message. The base station 105-c may map resources of the SSBs to one or more ROs of a random access preamble of a random access message and one or more PRUs of a random access payload over PUSCH configuration periods of an association pattern period of a random access procedure. At 810, the base station 105-c may transmit signaling including configuration (e.g., information of the mapping and the association) to the UE 115-c. In some examples, the signaling may include system information signaling, RRC signaling, or the like. At 815, the UE 115-c may determine the mapping between SSBs and a random access message of the random access procedure, for example, based in part on the signaling. At 820, the UE 115-c may determine an association between one or more beams carrying the SSBs and one or more additional beams carrying the random access message.

At 825, the base station 105-c and the UE 115-c may continue the random access procedure. For example, the base station 105-c may transmit one or more SSBs to the UE 115-c on one or more respective directional beams that correspond to one or more ROs. The random access procedure may also have the UE 115-c transmit a random access message (also referred to as msgA) to the base station 105-c. When the random access procedure is a two-step random access procedure, msgA transmitted from the UE 115-c may include a preamble and a random access payload. For example, as part of the random access procedure, the UE 115-c may transmit the msgA using a preamble (also referred to as a RACH preamble, a PRACH preamble, or a sequence). In some examples, the msgA may include a UE identifier in the msgA, so that the base station 105-c may recognize UE 115-c among other UEs. The UE 115-c may transmit the msgA on one or more respective directional beams based on the mapping and the beam association. The base station 105-c may transmit a random access message (also referred to as msgB) to the UE 115-c. The msgB may be a random access response to the received random access message (e.g., msgA) from the UE 115-c. In some examples, the base station 105-c may transmit the msgB to the UE 115-c based in part on a UE contention resolution identifier, a RA-RNTI, or the like. For example, as part of the random access procedure, the UE 115-c may transmit the msgB on a DL-SCH according to the RA-RNTI. The base station 105-c may transmit the msgB on one or more respective directional beams based on the mapping and the beam association.

Figure 9:
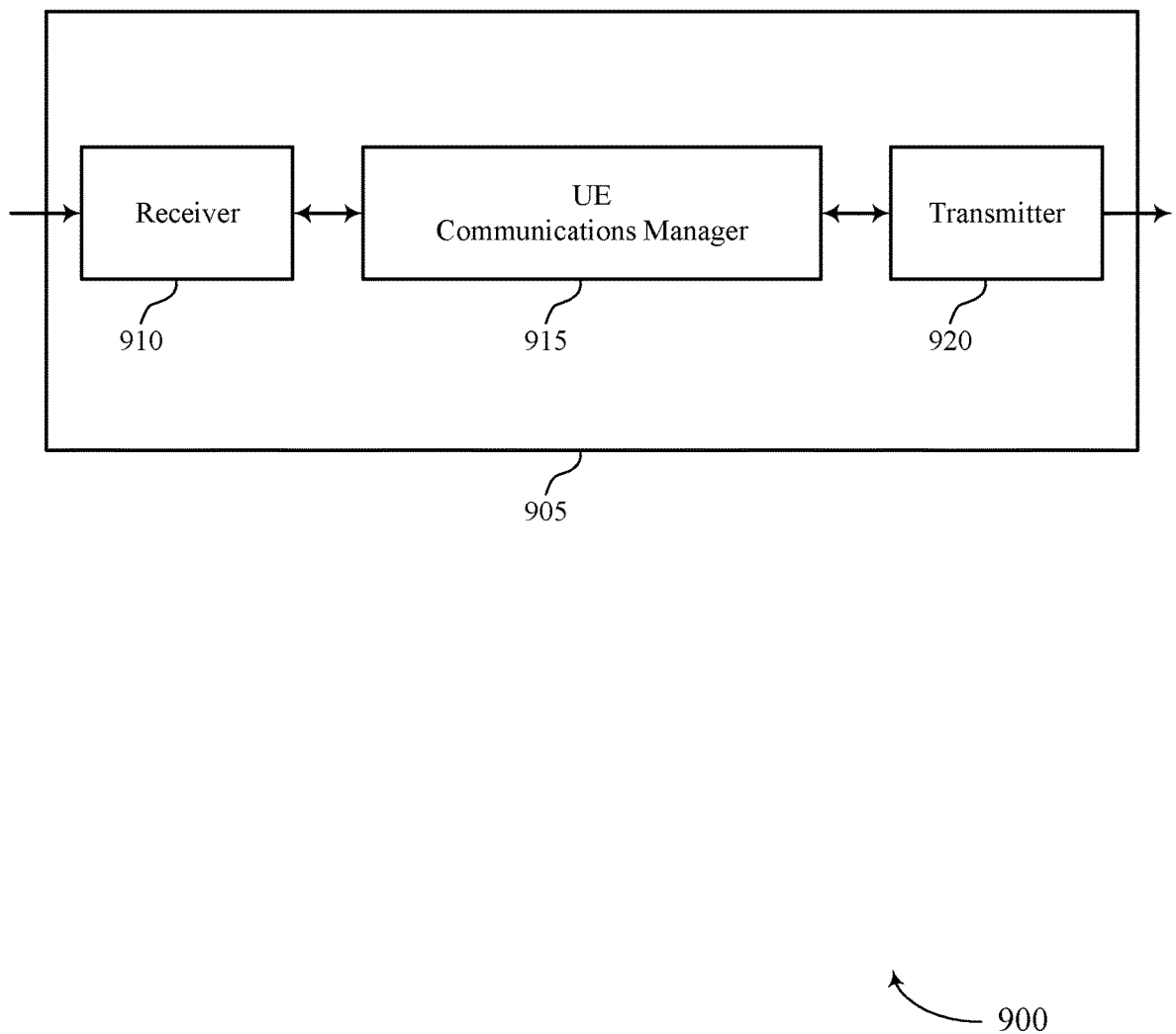
FIGS. 9 and 10 show block diagrams of devices that support beam association in random access procedures in accordance with aspects of the present disclosure.

FIG. 9 shows a block diagram 900 of a device 905 that supports beam association in random access procedures in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam association in random access procedures, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may determine a mapping between SSBs and a random access message of a two-step random access procedure based on an indication in system information signaling or RRC signaling, the random access message including a random access preamble and a random access payload, determine, based on the mapping, an association between one or more beams carrying the SSBs and one or more additional beams carrying the random access preamble and the random access payload of the random access message, and perform the two-step random access procedure with a base station. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
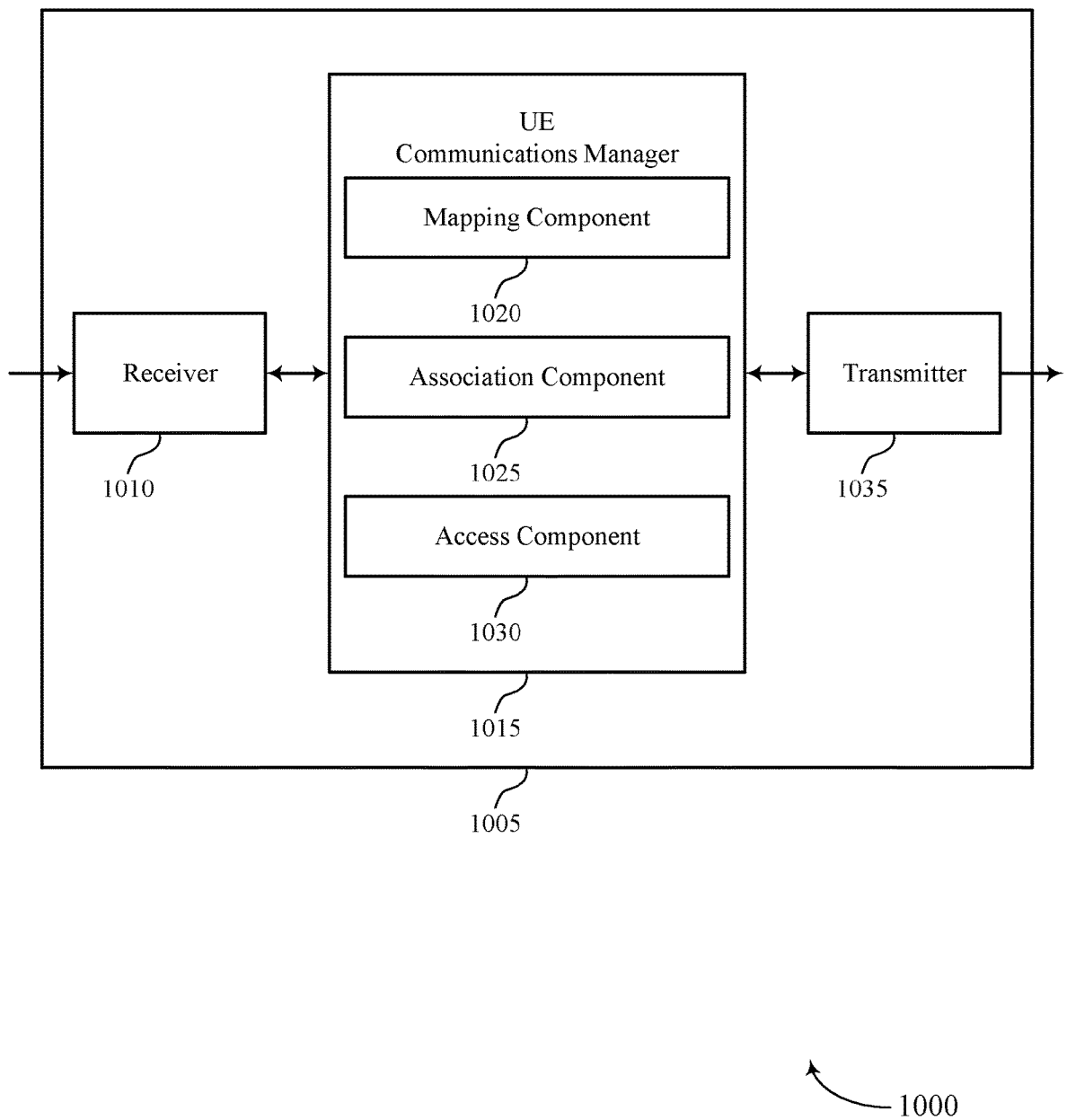

FIG. 10 shows a block diagram 1000 of a device 1005 that supports beam association in random access procedures in accordance with aspects of the present disclosure. The device 1005 may be an example of aspects of a device 905, or a UE 115 as described herein. The device 1005 may include a receiver 1010, a UE communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to beam association in random access procedures, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a mapping component 1020, an association component 1025, and an access component 1030. The UE communications manager 1015 may be an example of aspects of the UE communications manager 1210 described herein.

The mapping component 1020 may determine a mapping between SSBs and a random access message of a two-step random access procedure based on an indication, the random access message including a random access preamble and a random access payload. The association component 1025 may determine, based on the mapping, an association between one or more beams carrying the SSBs and one or more additional beams carrying the random access preamble and the random access payload of the random access message. The access component 1030 may perform the two-step random access procedure with a base station.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
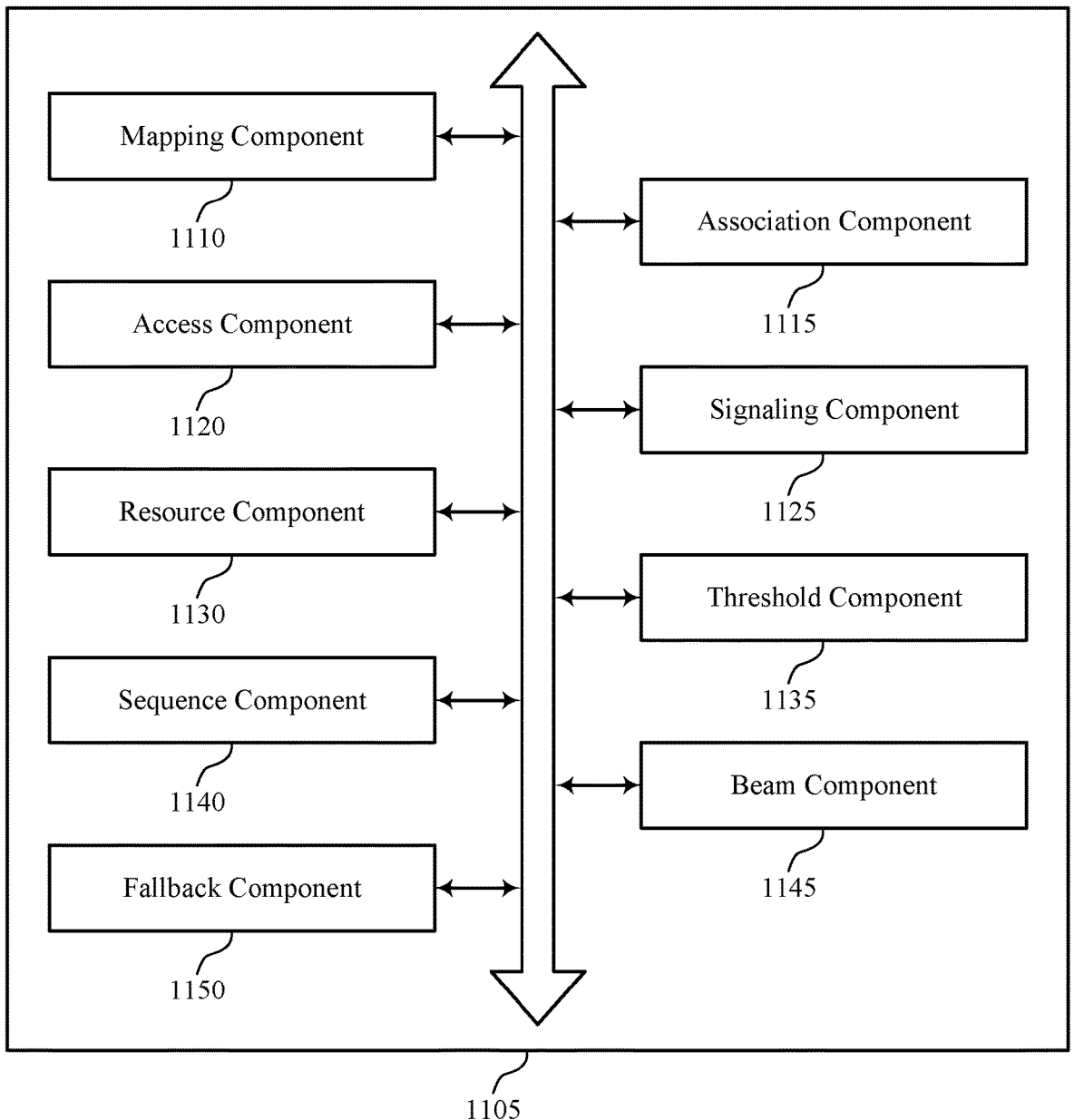
FIG. 11 shows a block diagram of a UE communications manager that supports beam association in random access procedures in accordance with aspects of the present disclosure.

FIG. 11 shows a block diagram 1100 of a UE communications manager 1105 that supports beam association in random access procedures in accordance with aspects of the present disclosure. The UE communications manager 1105 may be an example of aspects of a UE communications manager 915, a UE communications manager 1015, or a UE communications manager 1210 described herein. The UE communications manager 1105 may include a mapping component 1110, an association component 1115, an access component 1120, a signaling component 1125, a resource component 1130, a threshold component 1135, a sequence component 1140, a beam component 1145, and a fallback component 1150. Each of these modules may communicate, directly or indirectly, with one another (e.g., via one or more buses).

The mapping component 1110 may determine a mapping between SSBs and a random access message of a two-step random access procedure based on an indication, the random access message including a random access preamble and a random access payload. In some examples, the mapping component 1110 may map resources of the SSBs to one or more ROs of the random access preamble and one or more PRUs of the random access payload over PRACH configuration periods of an association pattern period of the two-step random access procedure. In some examples, the mapping component 1110 may determine the association pattern period of the two-step random access procedure based on a second indication, where the association pattern period of the two-step random access procedure is based on a factor value of an association pattern period of a four-step random access procedure, the factor value including an integer value within a finite range configured by a network.

In some examples, the mapping component 1110 may determine a mapping between the one or more PRUs of the random access payload sharing the time/frequency resources and an SSB of the SSBs or a portion of SSBs of the SSBs, where the portion of SSBs of the SSBs are grouped. In some examples, the mapping component 1110 may map the one or more PRUs of the random access payload sharing the time/frequency resources to the SSB of the SSBs based on an analog beam forming capability. In some examples, the mapping component 1110 may map the one or more PRUs of the random access payload sharing the time/frequency resources to the portion of SSBs of the SSBs based on a digital beam forming capability. In some cases, the random access preamble and the random access payload of the random access message are associated with different SSBs of the SSBs based on a duration of a guard period associated with the random access preamble and a gap period between the random access preamble and the random access payload. In some cases, the random access preamble of the two-step random access procedure and the random access message of the four-step random access procedure are mapped to different SSBs of the number of SSBs.

The association component 1115 may determine, based on the mapping, an association between one or more beams carrying the SSBs and one or more additional beams carrying the random access preamble and the random access payload of the random access message. In some examples, the association component 1115 may determine a second association between the one or more beams carrying the SSBs and the one or more additional beams carrying the random access preamble and the random access payload of the random access message over additional PRACH configuration periods of a second association pattern period of the two-step random access procedure. In some examples, the second association over the second association pattern period of the two-step random access procedure may be different from the association over the association pattern period of the two-step random access procedure.

In some examples, determining the association between the one or more beams carrying the SSBs and the one or more additional beams carrying the random access preamble and the random access payload of the random access message based on a physical random access channel occasion index of the one or more ROs, where the indication includes the physical random access channel occasion index. In some examples, determining the association between the one or more beams carrying the SSBs and the one or more additional beams carrying the random access preamble and the random access payload of the random access message based on a preamble sequence of the random access preamble, where the indication includes the preamble sequence. In some examples, determining the association between the one or more beams carrying the SSBs and the one or more additional beams carrying the random access preamble and the random access payload of the random access message based on a physical uplink shared channel resource unit index associated with the one or more PRUs of the random access payload, where the indication includes the physical uplink shared channel resource unit index. In some examples, determining the association between the one or more beams carrying the SSBs and the one or more additional beams carrying the random access preamble and the random access payload of the random access message based on multiplexing UCI on one or more of the random access preamble and the random access payload of the random access message, where the indication includes the multiplexing of the UCI.

The access component 1120 may perform the two-step random access procedure with a base station. In some examples, the access component 1120 may transmit the random access message of the two-step random access procedure during an association pattern period to the base station. In some examples, the access component 1120 may retransmit the random access message of the two-step random access procedure during the association pattern period based on a retransmission counter being less than a threshold.

The signaling component 1125 may receive, from the base station, signaling including the indication including the association between the one or more beams carrying the SSBs and the one or more additional beams carrying the random access preamble and the random access payload of the random access message. In some cases, the signaling includes system information signaling. In some cases, the signaling includes RRC signaling.

The resource component 1130 may determine that one or more PRUs of the random access payload share time/frequency resources. In some examples, the resource component 1130 may determine that the one or more ROs of the random access preamble are shared with one or more additional random access preambles of a four-step random access procedure. In some examples, the resource component 1130 may resources of the transmitting the random access message of the two-step random access procedure during an association pattern period to the base station are same resources of the retransmitting the random access message of the two-step random access procedure during the association pattern period based on the retransmission counter satisfying the threshold. In some examples, the resource component 1130 may resources of the transmitting the random access message of the two-step random access procedure during an association pattern period to the base station are different from resources of the retransmitting the random access message of the two-step random access procedure during the association pattern period based on the retransmission counter satisfying the threshold.

In some cases, the random access preamble of the two-step random access procedure shares the one or more ROs with the one or more additional random access preambles of the four-step random access procedure based on a UE capability. In some cases, the random access preamble of the two-step random access procedure shares the one or more ROs with the one or more additional random access preambles of the four-step random access procedure based on a random access procedure fallback capability. In some cases, the random access preamble of the two-step random access procedure shares the one or more ROs with the one or more additional random access preambles of the four-step random access procedure based on a load balancing capability. In some cases, the random access preamble of the two-step random access procedure shares the one or more ROs with the one or more additional random access preambles of the four-step random access procedure based on a multiplexing of contention-free random access and contention-based random access. In some cases, a portion of the number of SSBs mapped to the random access preamble of the two-step random access procedure are one or more of consecutive in time domain or nonconsecutive in the time domain.

The threshold component 1135 may determine that the number of SSBs satisfies a threshold. In some examples, the threshold component 1135 may determine that the number of SSBs is greater than a threshold, where the number of SSBs are mapped to same ROs of the one or more ROs shared between the random access preamble of the two-step random access procedure and a random access message of a four-step random access procedure.

The sequence component 1140 may determine that the random access preamble of the random access message of the two-step random access procedure and a random access message of a four-step random access procedure are configured with different subsets of preamble sequences. In some examples, the sequence component 1140 may preamble sequences in each subset of the subsets of preamble sequences are nonoverlapping. In some cases, an index of preamble sequences in each subset of the subsets of preamble sequences are consecutive.

The beam component 1145 may transmit beams mapped to the random access preamble of the two-step random access procedure and the random access message of the four-step random access procedure have a same or different preamble sequence size based on a spatial separation of the transmit beams mapped to the random access preamble of the two-step random access procedure and the random access message of the four-step random access procedure. In some examples, the beam component 1145 may perform a beam switch of the one or more additional beams carrying the random access preamble or the random access payload of the random access message, or both. In some examples, the beam component 1145 may determine a change in a physical random access channel occasion index of the one or more ROs. In some examples, the beam component 1145 performing the beam switch of the one or more additional beams carrying the random access preamble or the random access payload of the random access message, or both is based on the change in the physical random access channel occasion index.

In some examples, the beam component 1145 may determine a change in a physical uplink shared channel resource unit index associated with the one or more PRUs of the random access payload. In some examples, the beam component 1145 performing the beam switch of the one or more additional beams carrying the random access preamble or the random access payload of the random access message, or both is based on the change in the physical uplink shared channel resource unit index associated with the one or more PRUs of the random access payload. In some examples, the beam component 1145 may determine a change in a preamble sequence index of the random access preamble. In some examples, the beam component 1145 performing the beam switch of the one or more additional beams carrying the random access preamble or the random access payload of the random access message, or both is based on the change in the random access preamble. In some examples, the beam component 1145 may determine to multiplex UCI on one or more of the random access preamble and the random access payload of the random access message.

In some examples, the beam component 1145 performing the beam switch of the one or more additional beams carrying the random access preamble or the random access payload of the random access message, or both is based on multiplexing the UCI on one or more of the random access preamble and the random access payload of the random access message. In some examples, the beam component 1145 may perform the beam switch of the one or more additional beams carrying the random access preamble or the random access payload of the random access message, or both jointly with an additional beam switch by the base station of the one or more beams carrying the SSBs.

In some cases, the random access preamble of the random access message of the two-step random access procedure and the random access message of the four-step random access procedure have a same receive beam. In some cases, the number of SSBs have different transmit beams. In some cases, the random access preamble of the random access message of the two-step random access procedure and the random access message of the four-step random access procedure have different receive beams. In some cases, the beam switch is enabled based on one or more of the association, the mapping, or a trigger indication. In some cases, the trigger indication includes one or more of a preamble sequence, a reference signal, or UCI.

The fallback component 1150 may perform a random access fallback procedure or a random access switch procedure from the two-step random access procedure to a four-step random access procedure, where performing the beam switch is based on the random access fallback procedure or the random access switch procedure. In some examples, the fallback component 1150 may identify a random access message of the four-step random access procedure based on the random access fallback procedure or the random access switch procedure, where performing the beam switch is based on control signaling from the base station, the beam switch including a switch of one or more of a transmit beam and a receive beam. In some examples, the fallback component 1150 may identify a random access message of the four-step random access procedure based on the random access fallback procedure or the random access switch procedure, where performing the beam switch is based on preconfiguration information including the association. In some cases, the control signaling includes DCI.

Figure 12:
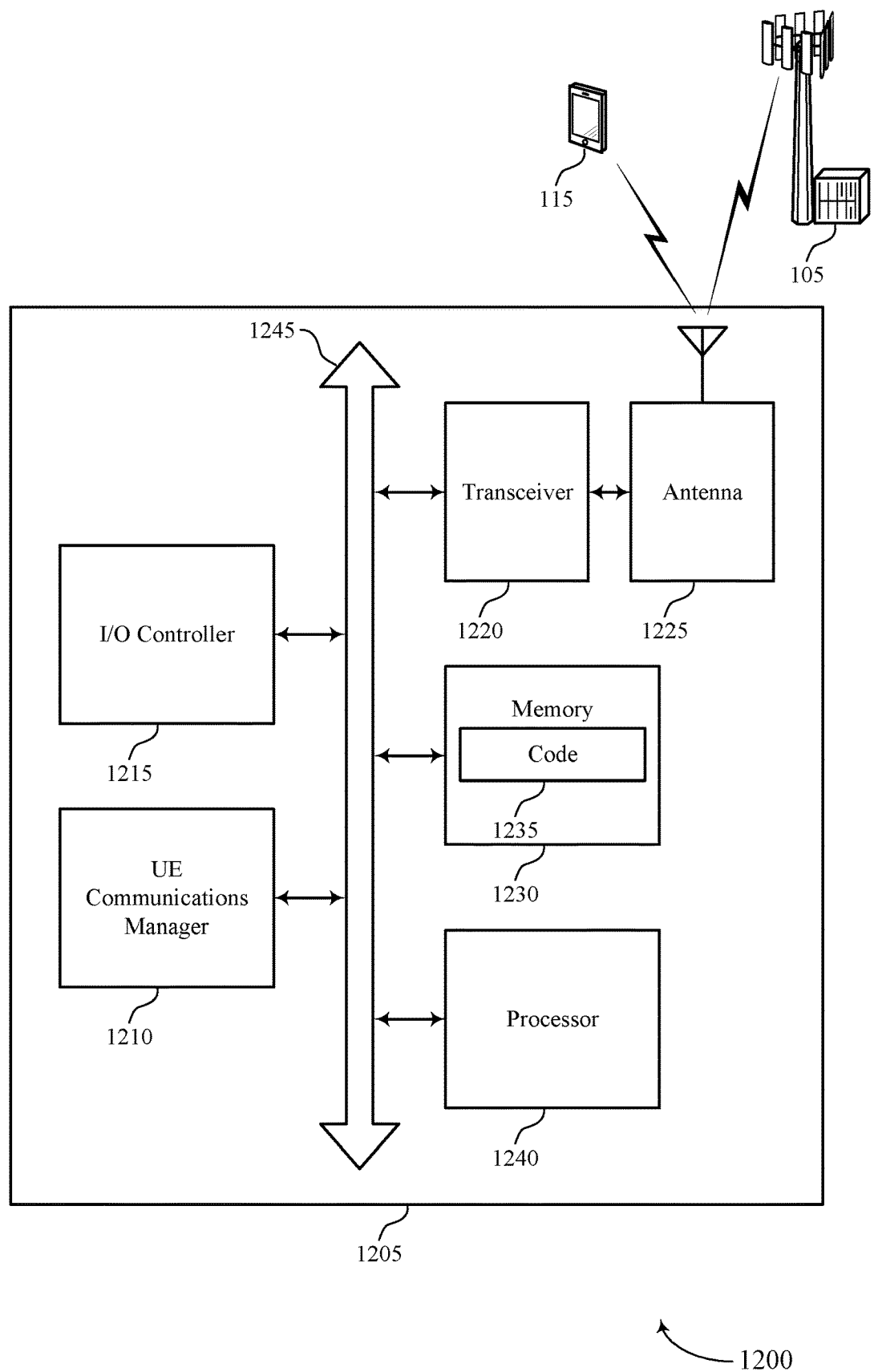
FIG. 12 shows a diagram of a system including a device that supports beam association in random access procedures in accordance with aspects of the present disclosure.

FIG. 12 shows a diagram of a system 1200 including a device 1205 that supports beam association in random access procedures in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 as described herein may be implemented to realize one or more potential advantages. One implementation may allow the device 1205 to save power and increase battery life by communicating with a base station 105 (as shown in FIG. 1) more efficiently. Another implementation may promote low latency communications at the device 1205, as beam association for random access messaging relating to different random access procedures may be improved.

The UE communications manager 1210 may determine a mapping between SSBs and a random access message of a two-step random access procedure based on an indication, the random access message including a random access preamble and a random access payload, determine, based on the mapping, an association between one or more beams carrying the SSBs and one or more additional beams carrying the random access preamble and the random access payload of the random access message, and perform the two-step random access procedure with a base station.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases the device 1205 may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam association in random access procedures).

Figure 13:
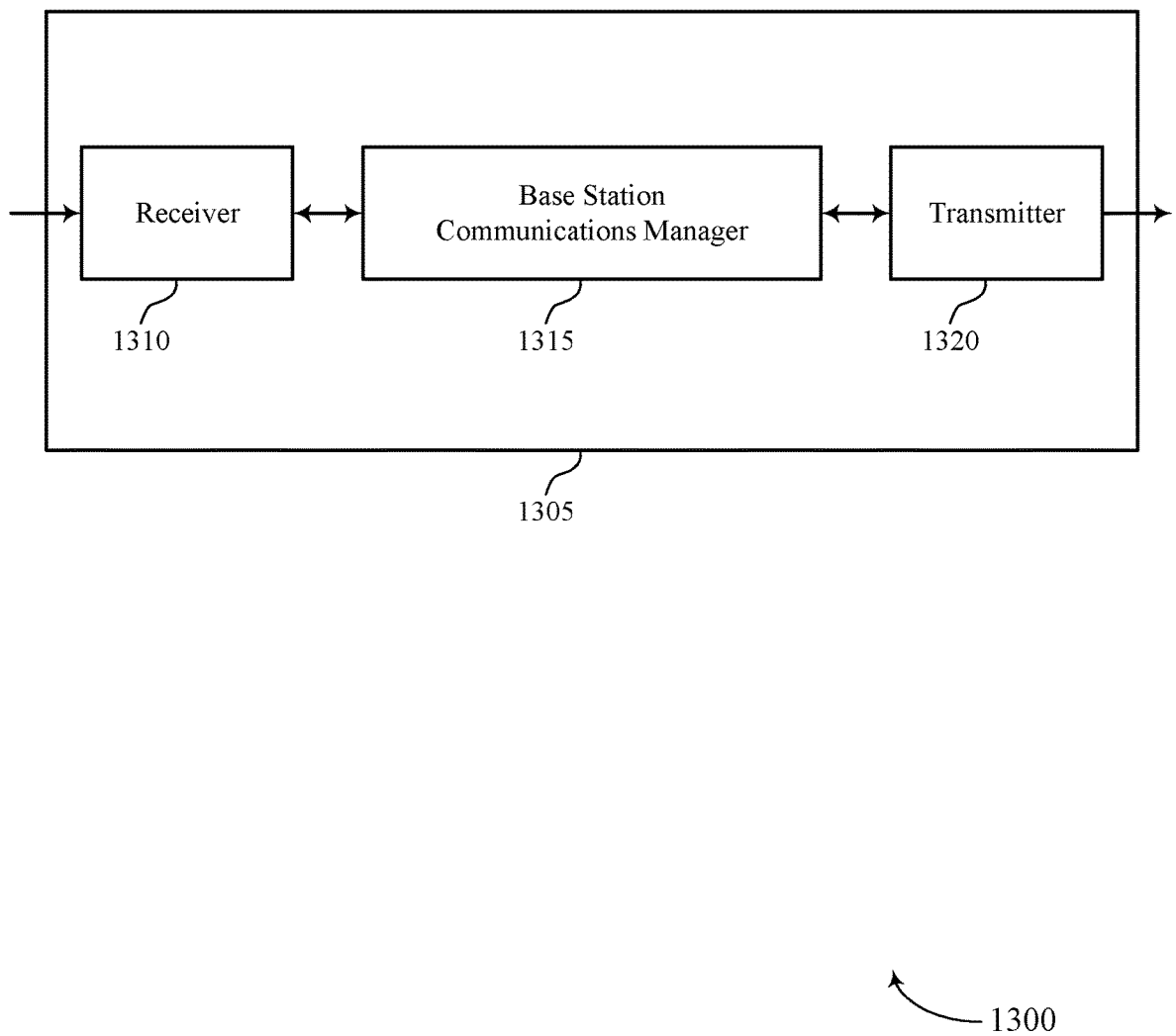
FIGS. 13 and 14 show block diagrams of devices that support beam association in random access procedures in accordance with aspects of the present disclosure.

FIG. 13 shows a block diagram 1300 of a device 1305 that supports beam association in random access procedures in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to beam association in random access procedures, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message, transmit information to a UE including one or more of the mapping between the SSBs and the random access message of the two-step random access procedure and the association between the one or more beams carrying the SSBs and the one or more additional beams carrying the random access preamble and the random access payload of the random access message, and perform the two-step random access procedure with the UE according to the mapping. The base station communications manager 1315 may be an example of aspects of a base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
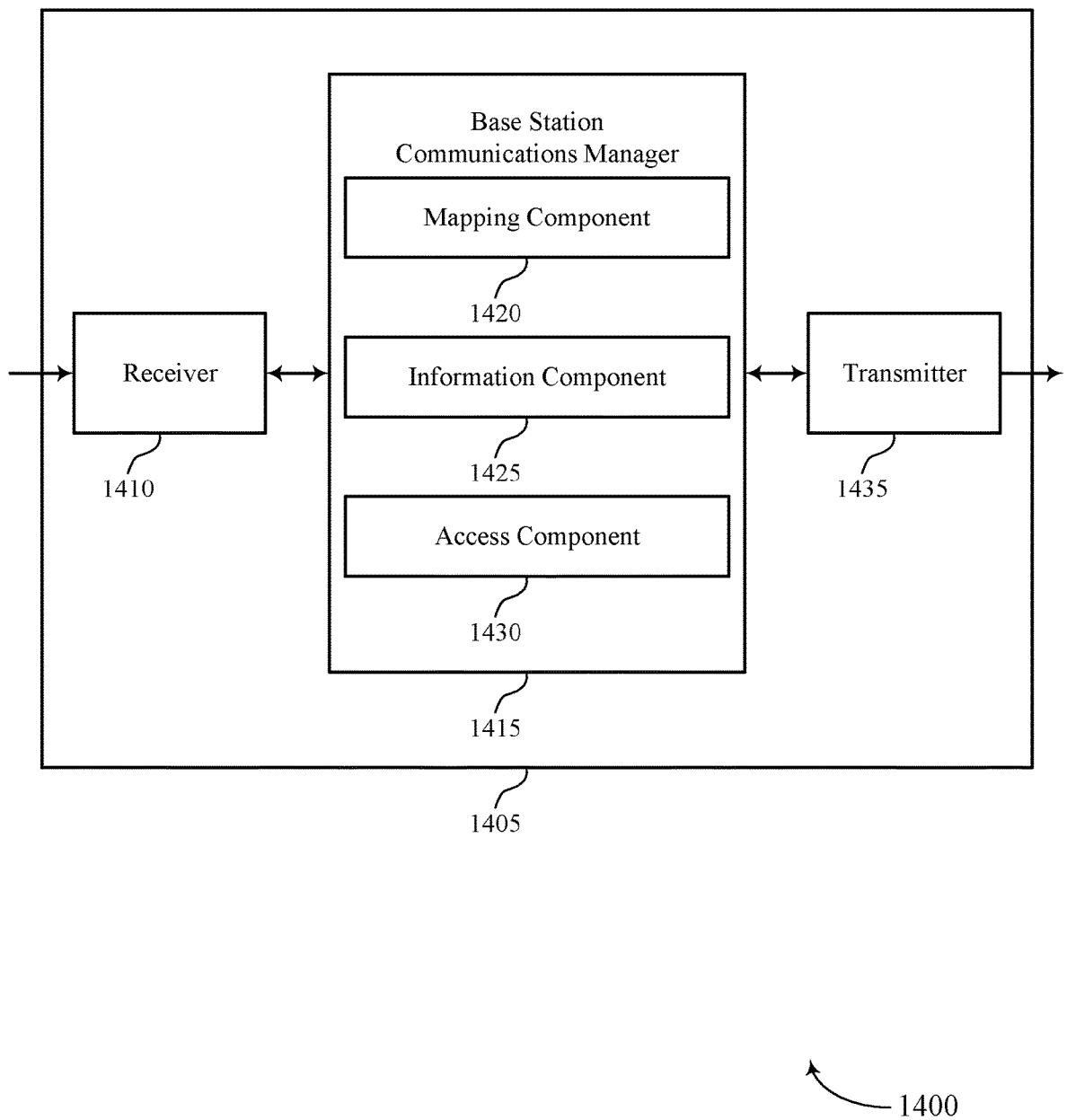

FIG. 14 shows a block diagram 1400 of a device 1405 that supports beam association in random access procedures in accordance with aspects of the present disclosure. The device 1405 may be an example of aspects of a device 1305, or a base station 105 as described herein. The device 1405 may include a receiver 1410, a base station communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to beam association in random access procedures, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a mapping component 1420, an information component 1425, and an access component 1430. The base station communications manager 1415 may be an example of aspects of the base station communications manager 1610 described herein.

The mapping component 1420 may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message. The information component 1425 may transmit information to a UE including one or more of the mapping between the SSBs and the random access message of the two-step random access procedure and the association between the one or more beams carrying the SSBs and the one or more additional beams carrying the random access preamble and the random access payload of the random access message. The access component 1430 may perform the two-step random access procedure with the UE according to the mapping.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
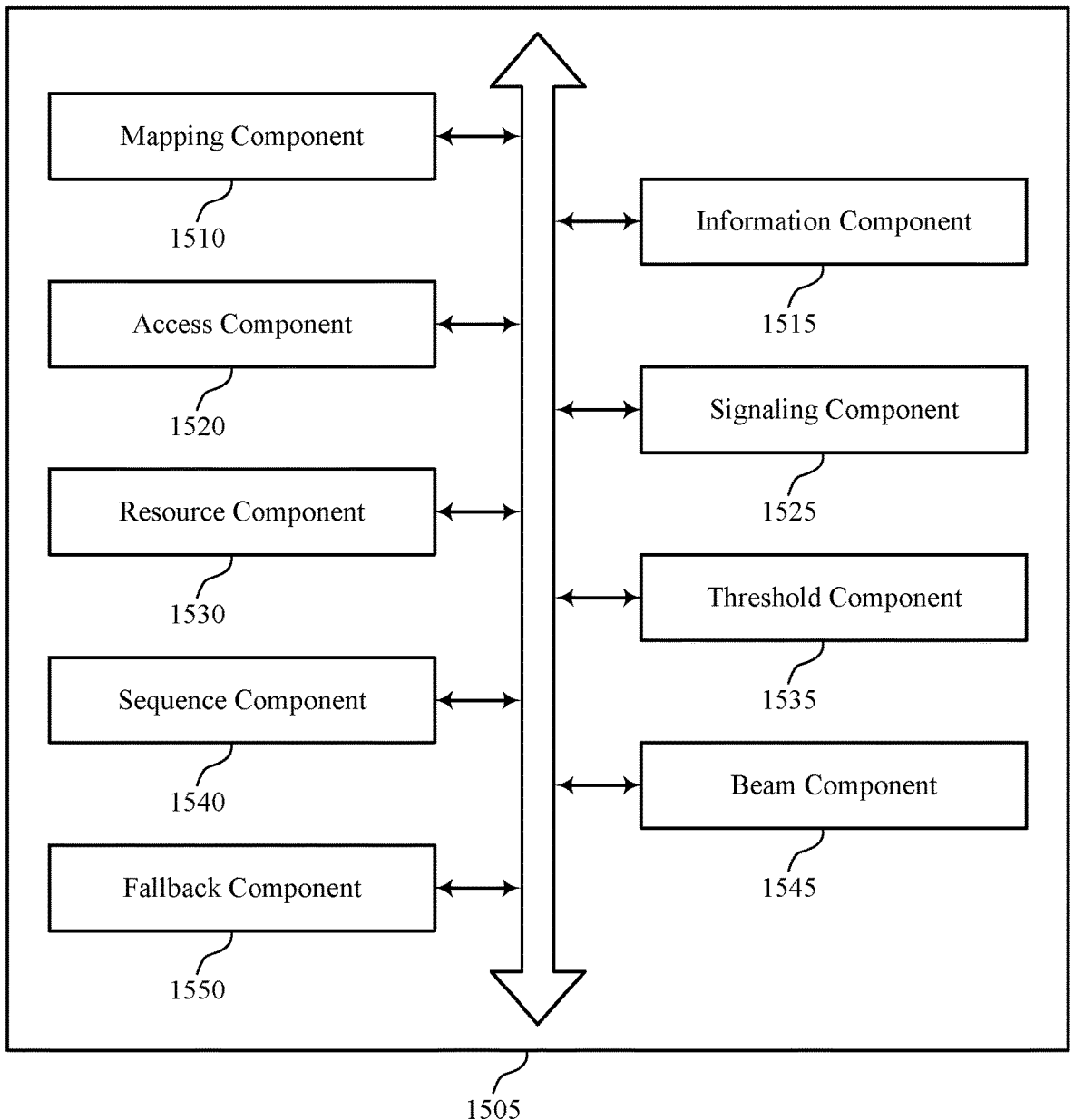
FIG. 15 shows a block diagram of a base station communications manager that supports beam association in random access procedures in accordance with aspects of the present disclosure.

FIG. 15 shows a block diagram 1500 of a base station communications manager 1505 that supports beam association in random access procedures in accordance with aspects of the present disclosure. The base station communications manager 1505 may be an example of aspects of a base station communications manager 1315, a base station communications manager 1415, or a base station communications manager 1610 described herein. The base station communications manager 1505 may include a mapping component 1510, an information component 1515, an access component 1520, a signaling component 1525, a resource component 1530, a threshold component 1535, a sequence component 1540, a beam component 1545, and a fallback component 1550. Each of these modules may communicate, directly or indirectly, with one another (e.g., via one or more buses).

The mapping component 1510 may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message. In some examples, the mapping component 1510 may map resources of the SSBs to one or more ROs of the random access preamble and one or more PRUs of the random access payload over PRACH configuration periods of an association pattern period of the two-step random access procedure.

The mapping component 1510 may determine a mapping between the one or more PRUs of the random access payload sharing time/frequency resources and an SSB of the SSBs or a portion of SSBs of the SSBs, where the portion of SSBs of the SSBs are grouped. In some examples, the mapping component 1510 may map the one or more PRUs of the random access payload sharing the time/frequency resources to the SSB of the SSBs based on an analog beam forming capability. In some examples, the mapping component 1510 may map the one or more PRUs of the random access payload sharing the time/frequency resources to the portion of SSBs of the SSBs based on a digital beam forming capability. In some cases, the random access preamble and the random access payload of the random access message are associated with different SSBs of the SSBs based on a duration of a guard period associated with the random access preamble and a gap period between the random access preamble and the random access payload.

The information component 1515 may transmit information to a UE including one or more of the mapping between the SSBs and the random access message of the two-step random access procedure and the association between the one or more beams carrying the SSBs and the one or more additional beams carrying the random access preamble and the random access payload of the random access message. The access component 1520 may perform the two-step random access procedure with the UE according to the mapping.

The signaling component 1525 may transmit signaling including the information including one or more of the mapping between the SSBs and the random access message of the two-step random access procedure and the association between the one or more beams carrying the SSBs and the one or more additional beams carrying the random access preamble and the random access payload of the random access message. In some cases, the signaling includes system information signaling. In some cases, the signaling includes RRC signaling.

The resource component 1530 may determine that one or more PRUs of the random access payload share time/frequency resources. In some cases, the random access preamble of the two-step random access procedure and the random access message of the four-step random access procedure are mapped to different SSBs of the number of SSBs. In some cases, a portion of the number of SSBs mapped to the random access preamble of the two-step random access procedure are one or more of consecutive in time domain or nonconsecutive in the time domain.

The threshold component 1535 may determine that the number of SSBs satisfies a threshold. In some examples, the threshold component 1535 may determine that the number of SSBs is greater than a threshold, where the number of SSBs are mapped to same ROs of one or more ROs shared between the random access preamble of the two-step random access procedure and a random access message of a four-step random access procedure.

The sequence component 1540 may determine that the random access preamble of the random access message of the two-step random access procedure and a random access message of a four-step random access procedure are configured with different subsets of preamble sequences. In some cases, the random access preamble of the random access message of the two-step random access procedure and the random access message of the four-step random access procedure have a same receive beam.

The beam component 1545 may perform a beam switch of the one or more additional beams carrying the random access preamble or the random access payload of the random access message, or both, where the one or more additional beams includes receive beams. In some examples, beam component 1545 may perform a beam switch of the one or more additional beams carrying the random access preamble or the random access payload of the random access message, or both jointly with a beam switch of the one or more beams carrying the SSBs, where the one or more additional beams includes receive beams and the one or more beams carrying the SSBs includes transmit beams. In some cases, the number of SSBs have different transmit beams. In some cases, the random access preamble of the random access message of the two-step random access procedure and the random access message of the four-step random access procedure have different receive beams.

The fallback component 1550 may perform a random access fallback procedure or a random access switch procedure from the two-step random access procedure to a four-step random access procedure, where performing the beam switch is based on the random access fallback procedure or the random access switch procedure. In some examples, the fallback component 1550 may identify a random access message of the four-step random access procedure based on the random access fallback procedure or the random access switch procedure. In some examples, the fallback component 1550 may transmit control signaling to the UE, where performing the beam switch is based on the control signaling, the beam switching including a switch of one or more of a transmit beam and a receive beam.

In some cases, the control signaling includes DCI.

Figure 16:
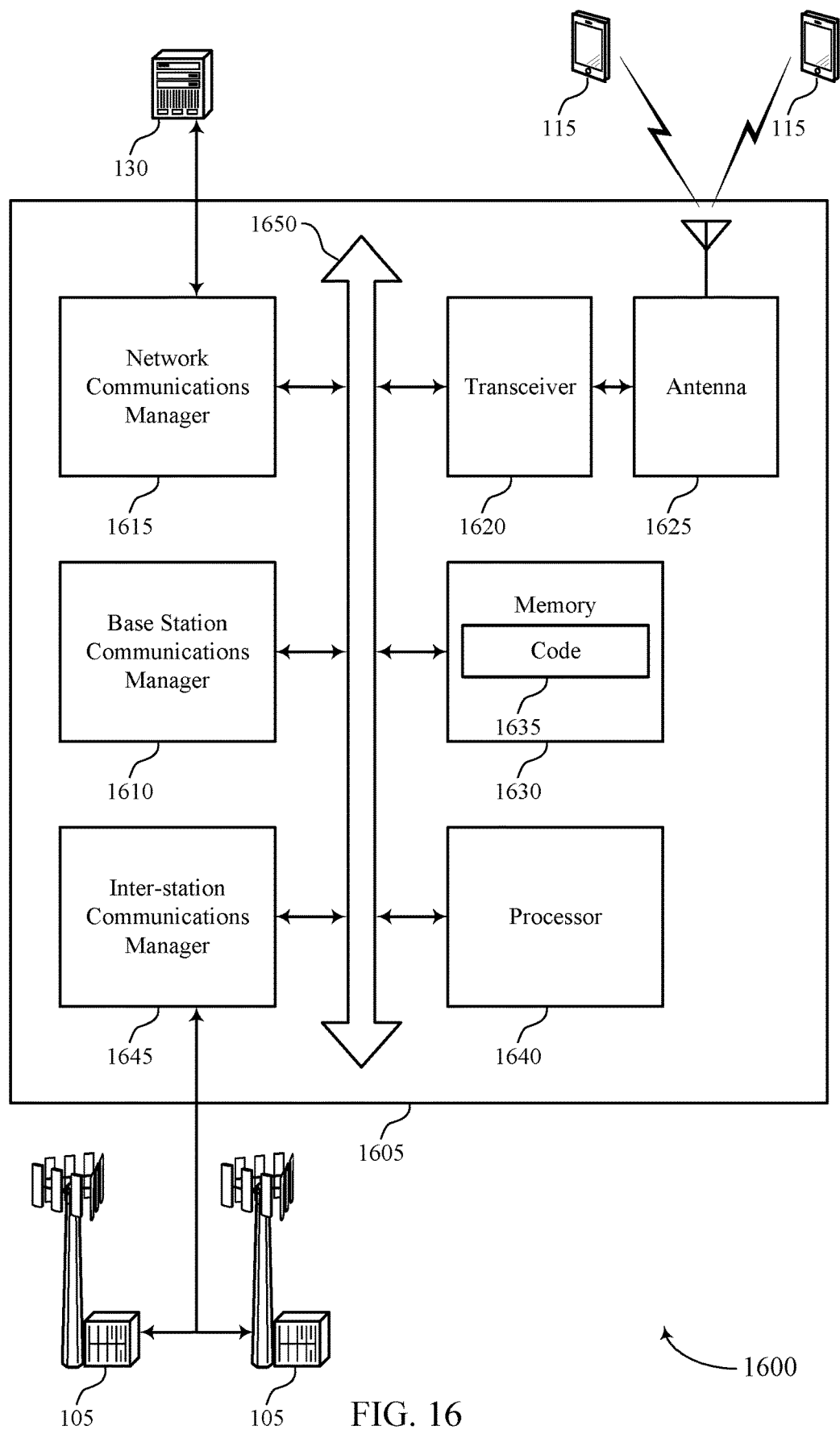
FIG. 16 shows a diagram of a system including a device that supports beam association in random access procedures in accordance with aspects of the present disclosure.

FIG. 16 shows a diagram of a system 1600 including a device 1605 that supports beam association in random access procedures in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message, transmit information to a UE including one or more of the mapping between the SSBs and the random access message of the two-step random access procedure and the association between the one or more beams carrying the SSBs and the one or more additional beams carrying the random access preamble and the random access payload of the random access message, and perform the two-step random access procedure with the UE according to the mapping.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some cases, the device 1605 may include a single antenna 1625. However, in some cases the device 1605 may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting beam association in random access procedures).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

Figure 17:
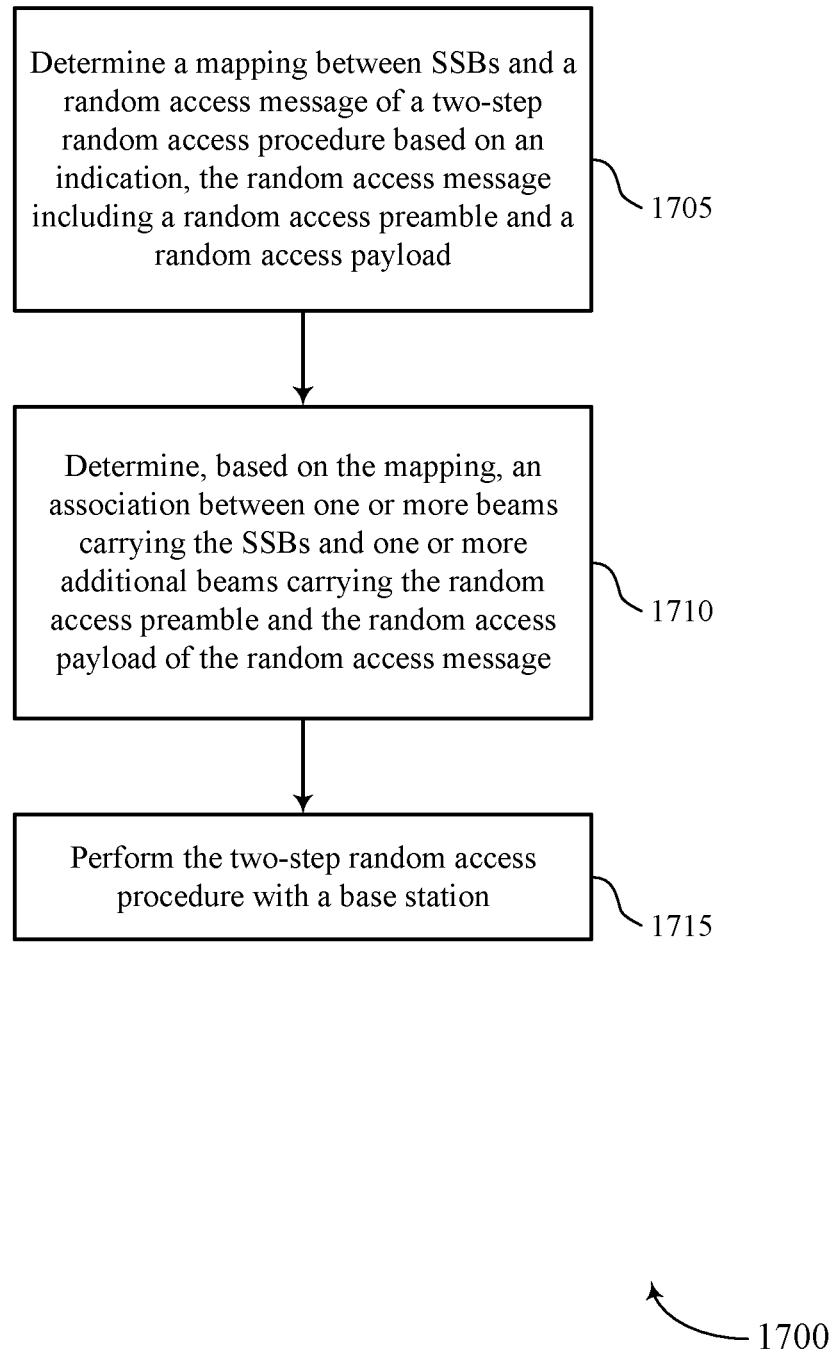
FIGS. 17 through 20 show flowcharts illustrating methods that support beam association in random access procedures in accordance with aspects of the present disclosure.

FIG. 17 shows a flowchart illustrating a method 1700 that supports beam association in random access procedures in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may determine a mapping between SSBs and a random access message of a two-step random access procedure based on an indication, the random access message including a random access preamble and a random access payload. The operations of 1705 may be performed according to the methods described herein. In some examples, aspects of the operations of 1705 may be performed by a mapping component as described with reference to FIGS. 9 through 12.

At 1710, the UE may determine, based on the mapping, an association between one or more beams carrying the SSBs and one or more additional beams carrying the random access preamble and the random access payload of the random access message. The operations of 1710 may be performed according to the methods described herein. In some examples, aspects of the operations of 1710 may be performed by an association component as described with reference to FIGS. 9 through 12.

At 1715, the UE may perform the two-step random access procedure with a base station. The operations of 1715 may be performed according to the methods described herein. In some examples, aspects of the operations of 1715 may be performed by an access component as described with reference to FIGS. 9 through 12.

Figure 18:
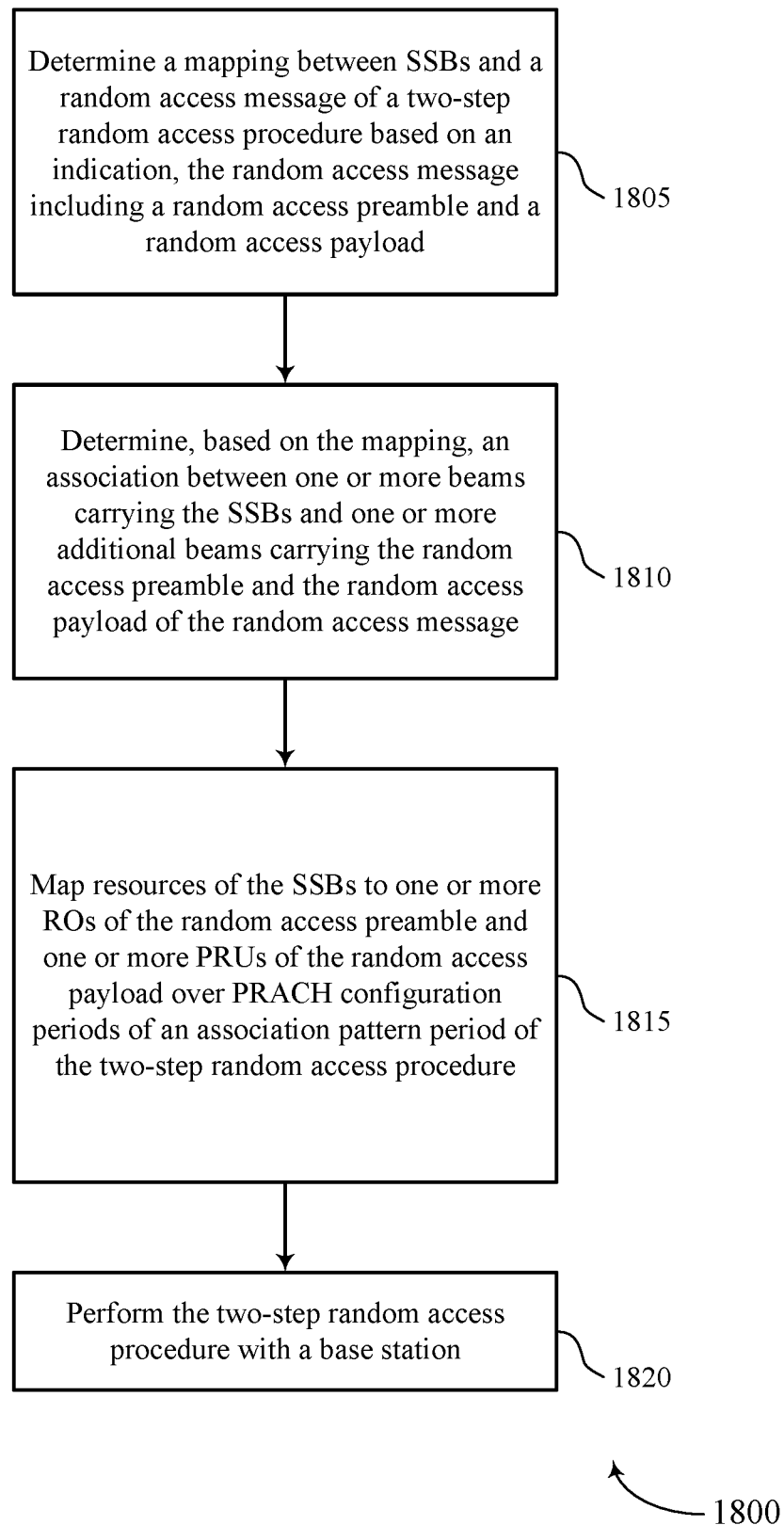

FIG. 18 shows a flowchart illustrating a method 1800 that supports beam association in random access procedures in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may determine a mapping between SSBs and a random access message of a two-step random access procedure based on an indication, the random access message including a random access preamble and a random access payload. The operations of 1805 may be performed according to the methods described herein. In some examples, aspects of the operations of 1805 may be performed by a mapping component as described with reference to FIGS. 9 through 12.

At 1810, the UE may determine, based on the mapping, an association between one or more beams carrying the SSBs and one or more additional beams carrying the random access preamble and the random access payload of the random access message. The operations of 1810 may be performed according to the methods described herein. In some examples, aspects of the operations of 1810 may be performed by an association component as described with reference to FIGS. 9 through 12.

At 1815, the UE may map resources of the SSBs to one or more ROs of the random access preamble and one or more PRUs of the random access payload over PRACH configuration periods of an association pattern period of the two-step random access procedure. The operations of 1815 may be performed according to the methods described herein. In some examples, aspects of the operations of 1815 may be performed by a mapping component as described with reference to FIGS. 9 through 12.

At 1820, the UE may perform the two-step random access procedure with a base station. The operations of 1820 may be performed according to the methods described herein. In some examples, aspects of the operations of 1820 may be performed by an access component as described with reference to FIGS. 9 through 12.

Figure 19:
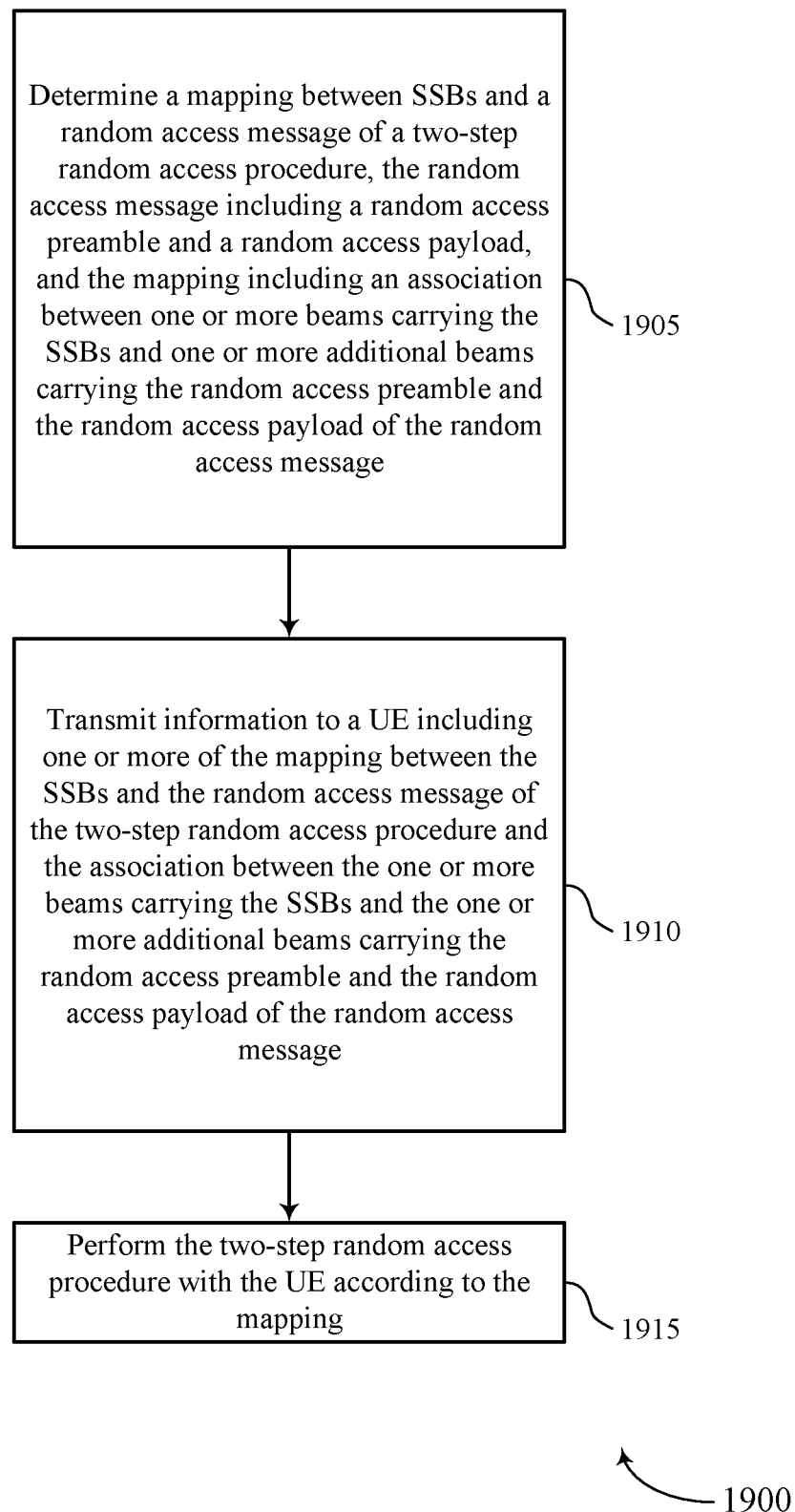

FIG. 19 shows a flowchart illustrating a method 1900 that supports beam association in random access procedures in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message. The operations of 1905 may be performed according to the methods described herein. In some examples, aspects of the operations of 1905 may be performed by a mapping component as described with reference to FIGS. 13 through 16.

At 1910, the base station may transmit information to a UE including one or more of the mapping between the SSBs and the random access message of the two-step random access procedure and the association between the one or more beams carrying the SSBs and the one or more additional beams carrying the random access preamble and the random access payload of the random access message. The operations of 1910 may be performed according to the methods described herein. In some examples, aspects of the operations of 1910 may be performed by an information component as described with reference to FIGS. 13 through 16.

At 1915, the base station may perform the two-step random access procedure with the UE according to the mapping. The operations of 1915 may be performed according to the methods described herein. In some examples, aspects of the operations of 1915 may be performed by an access component as described with reference to FIGS. 13 through 16.

Figure 20:
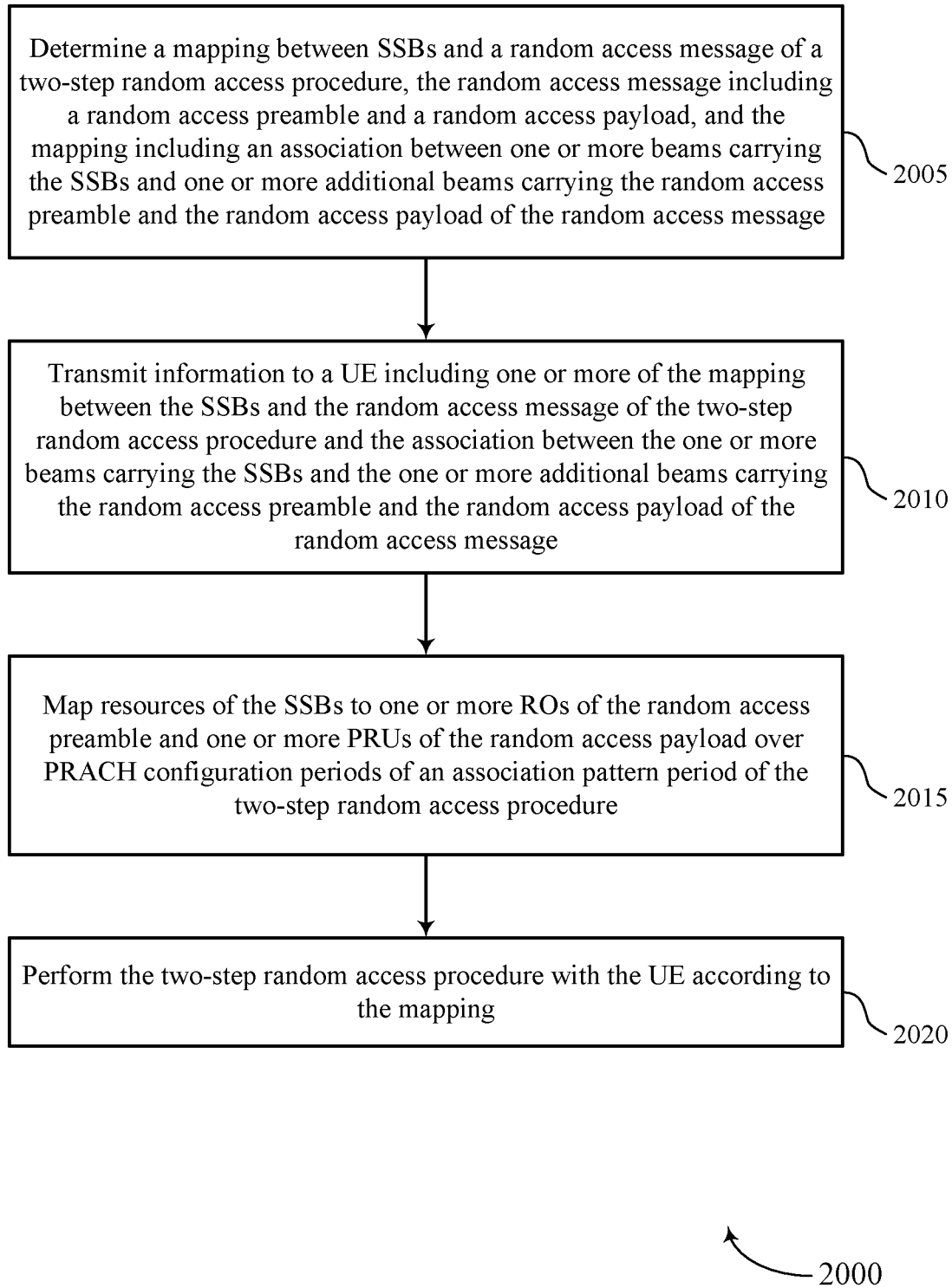

FIG. 20 shows a flowchart illustrating a method 2000 that supports beam association in random access procedures in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may determine a mapping between SSBs and a random access message of a two-step random access procedure, the random access message including a random access preamble and a random access payload, and the mapping including an association between one or more beams carrying the SSBs and one or more additional beams carrying the random access preamble and the random access payload of the random access message. The operations of 2005 may be performed according to the methods described herein. In some examples, aspects of the operations of 2005 may be performed by a mapping component as described with reference to FIGS. 13 through 16.

At 2010, the base station may transmit information to a UE including one or more of the mapping between the SSBs and the random access message of the two-step random access procedure and the association between the one or more beams carrying the SSBs and the one or more additional beams carrying the random access preamble and the random access payload of the random access message. The operations of 2010 may be performed according to the methods described herein. In some examples, aspects of the operations of 2010 may be performed by an information component as described with reference to FIGS. 13 through 16.

At 2015, the base station may map resources of the SSBs to one or more ROs of the random access preamble and one or more PRUs of the random access payload over PRACH configuration periods of an association pattern period of the two-step random access procedure. The operations of 2015 may be performed according to the methods described herein. In some examples, aspects of the operations of 2015 may be performed by a mapping component as described with reference to FIGS. 13 through 16.

At 2020, the base station may perform the two-step random access procedure with the UE according to the mapping. The operations of 2020 may be performed according to the methods described herein. In some examples, aspects of the operations of 2020 may be performed by an access component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   determining a mapping between synchronization signal blocks and a random access message of a two-step random access procedure based at least in part on an indication, the random access message comprising a random access preamble and a random access payload;
   determining, based at least in part on the mapping, an association between one or more beams carrying the synchronization signal blocks and one or more additional beams carrying the random access preamble and the random access payload of the random access message;
   determining an association pattern period of the two-step random access procedure based at least in part on a second indication, wherein the association pattern period of the two-step random access procedure is based at least in part on a factor value of an association pattern period of a four-step random access procedure, the factor value comprising an integer value within a range configured by a network entity;
   mapping resources of the synchronization signal blocks to one or more physical random access channel occasions of the random access preamble and one or more physical uplink shared channel resource units of the random access payload over physical random access channel configuration periods of the association pattern period of the two-step random access procedure; and
   performing the two-step random access procedure with the network entity.

2. The method of claim 1, further comprising:
   determining a second association between the one or more beams carrying the synchronization signal blocks and the one or more additional beams carrying the random access preamble and the random access payload of the random access message over additional physical random access channel configuration periods of a second association pattern period of the two-step random access procedure,
   wherein the second association over the second association pattern period of the two-step random access procedure is different from the association over the association pattern period of the two-step random access procedure.

3. The method of claim 1, further comprising:
   receiving, from the network entity, signaling including the indication comprising the association between the one or more beams carrying the synchronization signal blocks and the one or more additional beams carrying the random access preamble and the random access payload of the random access message, wherein the signaling comprises system information signaling or radio resource control signaling, or both.

4. The method of claim 1, further comprising:
   determining the association between the one or more beams carrying the synchronization signal blocks and the one or more additional beams carrying the random access preamble and the random access payload of the random access message based at least in part on a physical random access channel occasion index of the one or more physical random access channel occasions, wherein the indication comprises the physical random access channel occasion index.

5. The method of claim 1, further comprising:
   determining the association between the one or more beams carrying the synchronization signal blocks and the one or more additional beams carrying the random access preamble and the random access payload of the random access message based at least in part on a preamble sequence of the random access preamble, wherein the indication comprises the preamble sequence.

6. The method of claim 1, further comprising:
   determining the association between the one or more beams carrying the synchronization signal blocks and the one or more additional beams carrying the random access preamble and the random access payload of the random access message based at least in part on a physical uplink shared channel resource unit index associated with the one or more physical uplink shared channel resource units of the random access payload, wherein the indication comprises the physical uplink shared channel resource unit index.

7. The method of claim 1, further comprising:
determining the association between the one or more beams carrying the synchronization signal blocks and the one or more additional beams carrying the random access preamble and the random access payload of the random access message based at least in part on multiplexing uplink control information on one or more of the random access preamble and the random access payload of the random access message, wherein the indication comprises the multiplexing of the uplink control information.

8. The method of claim 1, wherein the random access preamble and the random access payload of the random access message are associated with different synchronization signal blocks of the synchronization signal blocks based at least in part on a duration of a guard period associated with the random access preamble and a gap period between the random access preamble and the random access payload.

9. The method of claim 1, further comprising:
determining that the one or more physical uplink shared channel resource units of the random access payload share one or more of time resources and frequency resources; and
determining a mapping between the one or more physical uplink shared channel resource units of the random access payload sharing one or more of the time resources and the frequency resources and a synchronization signal block of the synchronization signal blocks or a portion of synchronization signal blocks of the synchronization signal blocks, wherein the portion of synchronization signal blocks of the synchronization signal blocks are grouped.

10. The method of claim 9, wherein determining the mapping between the one or more physical uplink shared channel resource units of the random access payload sharing one or more of the time resources and the frequency resources, and the synchronization signal block of the synchronization signal blocks or the portion of synchronization signal blocks of the synchronization signal blocks comprises:
mapping the one or more physical uplink shared channel resource units of the random access payload sharing one or more of the time resources and the frequency resources to the synchronization signal block of the synchronization signal blocks based at least in part on an analog beam forming capability.

11. The method of claim 9, wherein determining the mapping between the one or more physical uplink shared channel resource units of the random access payload sharing one or more of the time resources and the frequency resources, and the synchronization signal block of the synchronization signal blocks or the portion of synchronization signal blocks of the synchronization signal blocks comprises:
mapping the one or more physical uplink shared channel resource units of the random access payload sharing one or more of the time resources and the frequency resources to the portion of synchronization signal blocks of the synchronization signal blocks based at least in part on a digital beam forming capability.

12. The method of claim 1, further comprising:
determining that the one or more physical random access channel occasions of the random access preamble are shared with one or more additional random access preambles of a four-step random access procedure based at least in part on a UE capability, a random access procedure fallback capability, a load balancing capability, or a multiplexing of contention-free random access and contention-based random access, or any combination thereof.

13. The method of claim 1, further comprising:
determining that a number of synchronization signal blocks satisfies a threshold; and
determining that the random access preamble of the random access message of the two-step random access procedure and a random access message of a four-step random access procedure are configured with different subsets of preamble sequences.

14. The method of claim 13, wherein an index of preamble sequences in each subset of the subsets of preamble sequences are consecutive.

15. The method of claim 13, wherein preamble sequences in each subset of the subsets of preamble sequences are nonoverlapping.

16. The method of claim 13, wherein the random access preamble of the random access message of the two-step random access procedure and the random access message of the four-step random access procedure have a same receive beam.

17. The method of claim 1, further comprising:
determining that number of synchronization signal blocks is greater than a threshold, wherein the number of synchronization signal blocks are mapped to same physical random access channel occasions of the one or more physical random access channel occasions shared between the random access preamble of the two-step random access procedure and a random access message of a four-step random access procedure.

18. The method of claim 17, wherein the number of synchronization signal blocks have different transmit beams.

19. The method of claim 17, wherein the random access preamble of the two-step random access procedure and the random access message of the four-step random access procedure are mapped to different synchronization signal blocks of the number of synchronization signal blocks.

20. The method of claim 19, wherein a portion of the number of synchronization signal blocks mapped to the random access preamble of the two-step random access procedure are one or more of consecutive in time domain or nonconsecutive in the time domain.

21. The method of claim 19, wherein transmit beams mapped to the random access preamble of the two-step random access procedure and the random access message of the four-step random access procedure have a same or different preamble sequence size based at least in part on a spatial separation of the transmit beams mapped to the random access preamble of the two-step random access procedure and the random access message of the four-step random access procedure.

22. The method of claim 19, wherein the random access preamble of the random access message of the two-step random access procedure and the random access message of the four-step random access procedure have different receive beams.

23. The method of claim 1, wherein performing the two-step random access procedure comprises:
transmitting the random access message of the two-step random access procedure during an association pattern period to the network entity; and
retransmitting the random access message of the two-step random access procedure during the association pattern period based at least in part on a retransmission counter being less than a threshold.

24. The method of claim 23, further comprising:
performing a beam switch of the one or more additional beams carrying the random access preamble or the random access payload of the random access message, or both.

25. The method of claim 24, further comprising:
determining a change in a physical random access channel occasion index of the one or more physical random access channel occasions,
wherein performing the beam switch of the one or more additional beams carrying the random access preamble or the random access payload of the random access message, or both is based at least in part on the change in the physical random access channel occasion index.

26. The method of claim 24, further comprising:
determining a change in a physical uplink shared channel resource unit index associated with the one or more physical uplink shared channel resource units of the random access payload,
wherein performing the beam switch of the one or more additional beams carrying the random access preamble or the random access payload of the random access message, or both is based at least in part on the change in the physical uplink shared channel resource unit index associated with the one or more physical uplink shared channel resource units of the random access payload.

27. The method of claim 24, further comprising:
determining a change in a preamble sequence index of the random access preamble,
wherein performing the beam switch of the one or more additional beams carrying the random access preamble or the random access payload of the random access message, or both is based at least in part on the change in the random access preamble.

28. The method of claim 24, further comprising:
determining to multiplex uplink control information on one or more of the random access preamble and the random access payload of the random access message,
wherein performing the beam switch of the one or more additional beams carrying the random access preamble or the random access payload of the random access message, or both is based at least in part on multiplexing the uplink control information on one or more of the random access preamble and the random access payload of the random access message.

29. The method of claim 24, further comprising:
performing the beam switch of the one or more additional beams carrying the random access preamble or the random access payload of the random access message, or both jointly with an additional beam switch by the network entity of the one or more beams carrying the synchronization signal blocks.

30. The method of claim 24, wherein the beam switch is enabled based at least in part on one or more of the association, the mapping, or a trigger indication comprising one or more of a preamble sequence, a reference signal, or uplink control information.

31. The method of claim 24, further comprising:
performing a random access fallback procedure or a random access switch procedure from the two-step random access procedure to a four-step random access procedure, wherein performing the beam switch is based at least in part on the random access fallback procedure or the random access switch procedure.

32. The method of claim 31, further comprising:
identifying a random access message of the four-step random access procedure based at least in part on the random access fallback procedure or the random access switch procedure, wherein performing the beam switch is based at least in part on control signaling comprising a downlink control information from the network entity, the beam switch comprising a switch of one or more of a transmit beam and a receive beam.

33. The method of claim 31, further comprising:
identifying a random access message of the four-step random access procedure based at least in part on the random access fallback procedure or the random access switch procedure, wherein performing the beam switch is based at least in part on preconfiguration information comprising the association.

34. The method of claim 23, wherein resources of the transmitting the random access message of the two-step random access procedure during an association pattern period to the network entity are same resources of the retransmitting the random access message of the two-step random access procedure during the association pattern period based at least in part on the retransmission counter satisfying the threshold.

35. The method of claim 23, wherein resources of the transmitting the random access message of the two-step random access procedure during an association pattern period to the network entity are different from resources of the retransmitting the random access message of the two-step random access procedure during the association pattern period based at least in part on the retransmission counter satisfying the threshold.

36. The method of claim 1, wherein the second indication indicates the association pattern period of the two-step random access procedure from a set of association pattern periods.

37. A method for wireless communication at a network entity, comprising:
determining a mapping between synchronization signal blocks and a random access message of a two-step random access procedure, the random access message comprising a random access preamble and a random access payload, and the mapping comprising an association between one or more beams carrying the synchronization signal blocks and one or more additional beams carrying the random access preamble and the random access payload of the random access message;
transmitting information to a user equipment comprising one or more of the mapping between the synchronization signal blocks and the random access message of the two-step random access procedure and the association between the one or more beams carrying the synchronization signal blocks and the one or more additional beams carrying the random access preamble and the random access payload of the random access message;
transmitting an indication to the user equipment indicating an association pattern period of the two-step random access procedure, wherein the association pattern period of the two-step random access procedure is based at least in part on a factor value of an association pattern period of a four-step random access procedure, the factor value comprising an integer value within a range configured by the network entity;
mapping resources of the synchronization signal blocks to one or more physical random access channel occasions of the random access preamble and one or more physical uplink shared channel resource units of the random access payload over physical random access channel configuration periods of the association pattern period of the two-step random access procedure; and performing the two-step random access procedure with the user equipment.

38. The method of claim 37 wherein transmitting the information to the user equipment comprises:

transmitting signaling comprising the information including one or more of the mapping between the synchronization signal blocks and the random access message of the two-step random access procedure and the association between the one or more beams carrying the synchronization signal blocks and the one or more additional beams carrying the random access preamble and the random access payload of the random access message, wherein the signal comprises system information signaling or radio resource control signaling, or both.

39. The method of claim 37, wherein the random access preamble and the random access payload of the random access message are associated with different synchronization signal blocks of the synchronization signal blocks based at least in part on a duration of a guard period associated with the random access preamble and a gap period between the random access preamble and the random access payload.

40. The method of claim 37, further comprising:

determining that one or more physical uplink shared channel resource units of the random access payload share one or more of time resources and frequency resources; and determining a mapping between the one or more physical uplink shared channel resource units of the random access payload sharing one or more of the time resources and the frequency resources and a synchronization signal block of the synchronization signal blocks or a portion of synchronization signal blocks of the synchronization signal blocks, wherein the portion of synchronization signal blocks of the synchronization signal blocks are grouped.

41. The method of claim 40, wherein determining the mapping between the one or more physical uplink shared channel resource units of the random access payload sharing one or more of the time resources and the frequency resources and the synchronization signal block of the synchronization signal blocks or the portion of synchronization signal blocks of the synchronization signal blocks comprises:

mapping the one or more physical uplink shared channel resource units of the random access payload sharing one or more of the time resources and the frequency resources to the synchronization signal block of the synchronization signal blocks based at least in part on an analog beam forming capability.

42. The method of claim 40, wherein determining the mapping between the one or more physical uplink shared channel resource units of the random access payload sharing the time resources and the synchronization signal block of the synchronization signal blocks or the portion of synchronization signal blocks of the synchronization signal blocks comprises:

mapping the one or more physical uplink shared channel resource units of the random access payload sharing the time resources to the portion of synchronization signal blocks of the synchronization signal blocks based at least in part on a digital beam forming capability.

43. The method of claim 37, further comprising:

determining that a number of synchronization signal blocks satisfies a threshold; and determining that the random access preamble of the random access message of the two-step random access procedure and a random access message of a four-step random access procedure have a same receive beam and are configured with different subsets of preamble sequences.

44. The method of claim 37, further comprising:

determining that a number of synchronization signal blocks is greater than a threshold, wherein the number of synchronization signal blocks are mapped to same physical random access channel occasions of the one or more physical random access channel occasions shared between the random access preamble of the two-step random access procedure and a random access message of a four-step random access procedure.

45. The method of claim 44, wherein the number of synchronization signal blocks have different transmit beams.

46. The method of claim 44, wherein the random access preamble of the two-step random access procedure and the random access message of the four-step random access procedure are mapped to different synchronization signal blocks of the number of synchronization signal blocks.

47. The method of claim 46, wherein a portion of the number of synchronization signal blocks mapped to the random access preamble of the two-step random access procedure are one or more of consecutive in time domain or nonconsecutive in the time domain.

48. The method of claim 46, wherein the random access preamble of the random access message of the two-step random access procedure and the random access message of the four-step random access procedure have different receive beams.

49. The method of claim 37, further comprising:

performing a beam switch of the one or more additional beams carrying the random access preamble or the random access payload of the random access message, or both, wherein the one or more additional beams comprises receive beams.

50. The method of claim 37, further comprising:

performing a beam switch of the one or more additional beams carrying the random access preamble or the random access payload of the random access message, or both jointly with a beam switch of the one or more beams carrying the synchronization signal blocks, wherein the one or more additional beams comprises receive beams and the one or more beams carrying the synchronization signal blocks comprises transmit beams.

51. The method of claim 50, further comprising:

performing a random access fallback procedure or a random access switch procedure from the two-step random access procedure to a four-step random access procedure, wherein performing the beam switch is based at least in part on the random access fallback procedure or the random access switch procedure.

52. The method of claim 51 further comprising:

identifying a random access message of the four-step random access procedure based at least in part on the random access fallback procedure or the random access switch procedure; and transmitting control signaling comprising downlink control information to the user equipment, wherein performing the beam switch is based at least in part on the control signaling, the beam switching comprising a switch of one or more of a transmit beam and a receive beam.

53. An apparatus for wireless communication, comprising:
a processor,
memory coupled with the processor; and
instructions stored in the memory and executable by the processor to cause the apparatus to:
determine a mapping between synchronization signal blocks and a random access message of a two-step random access procedure based at least in part on an indication, the random access message comprising a random access preamble and a random access payload;
determine, based at least in part on the mapping, an association between one or more beams carrying the synchronization signal blocks and one or more additional beams carrying the random access preamble and the random access payload of the random access message;
determine an association pattern period of the two-step random access procedure based at least in part on a second indication, wherein the association pattern period of the two-step random access procedure is based at least in part on a factor value of an association pattern period of a four-step random access procedure, the factor value comprising an integer value within a range configured by a network entity;
map resources of the synchronization signal blocks to one or more physical random access channel occasions of the random access preamble and one or more physical uplink shared channel resource units of the random access payload over physical random access channel configuration periods of the association pattern period of the two-step random access procedure; and
perform the two-step random access procedure with the network entity.

54. An apparatus for wireless communication, comprising:
a processor,
memory coupled with the processor; and
instructions stored in the memory and executable by the processor to cause the apparatus to:
determine a mapping between synchronization signal blocks and a random access message of a two-step random access procedure, the random access message comprising a random access preamble and a random access payload, and the mapping comprising an association between one or more beams carrying the synchronization signal blocks and one or more additional beams carrying the random access preamble and the random access payload of the random access message;
transmit information to a user equipment comprising one or more of the mapping between the synchronization signal blocks and the random access message of the two-step random access procedure and the association between the one or more beams carrying the synchronization signal blocks and the one or more additional beams carrying the random access preamble and the random access payload of the random access message;
transmit an indication to the user equipment indicating the association pattern period of the two-step random access procedure, wherein the association pattern period of the two-step random access procedure is based at least in part on a factor value of an association pattern period of a four-step random access procedure, the factor value comprising an integer value within a range configured by the apparatus;
map resources of the synchronization signal blocks to one or more physical random access channel occasions of the random access preamble and one or more physical uplink shared channel resource units of the random access payload over physical random access channel configuration periods of the association pattern period of the two-step random access procedure; and
perform the two-step random access procedure with the user equipment according to the mapping.

55. An apparatus for wireless communication, comprising:
means for determining a mapping between synchronization signal blocks and a random access message of a two-step random access procedure based at least in part on an indication, the random access message comprising a random access preamble and a random access payload;
means for determining, based at least in part on the mapping, an association between one or more beams carrying the synchronization signal blocks and one or more additional beams carrying the random access preamble and the random access payload of the random access message;
means for determining an association pattern period of the two-step random access procedure based at least in part on a second indication, wherein the association pattern period of the two-step random access procedure is based at least in part on a factor value of an association pattern period of a four-step random access procedure, the factor value comprising an integer value within a range configured by a network entity;
means for mapping resources of the synchronization signal blocks to one or more physical random access channel occasions of the random access preamble and one or more physical uplink shared channel resource units of the random access payload over physical random access channel configuration periods of the association pattern period of the two-step random access procedure; and
means for performing the two-step random access procedure with the network entity.

56. An apparatus for wireless communication, comprising:
means for determining a mapping between synchronization signal blocks and a random access message of a two-step random access procedure, the random access message comprising a random access preamble and a random access payload, and the mapping comprising an association between one or more beams carrying the synchronization signal blocks and one or more additional beams carrying the random access preamble and the random access payload of the random access message;
means for transmitting information to a user equipment comprising one or more of the mapping between the synchronization signal blocks and the random access message of the two-step random access procedure and the association between the one or more beams carrying the synchronization signal blocks and the one or more additional beams carrying the random access preamble and the random access payload of the random access message;

means for transmitting an indication to the user equipment indicating an association pattern period of the two-step random access procedure, wherein the association pattern period of the two-step random access procedure is based at least in part on a factor value of an association pattern period of a four-step random access procedure, the factor value comprising an integer value within a range configured by the apparatus;

means for mapping resources of the synchronization signal blocks to one or more physical random access channel occasions of the random access preamble and one or more physical uplink shared channel resource units of the random access payload over physical random access channel configuration periods of the association pattern period of the two-step random access procedure; and means for performing the two-step random access procedure with the user equipment according to the mapping.

57. A non-transitory computer-readable medium storing code for wireless communication at a user equipment, the code comprising instructions executable by a processor to:

determine a mapping between synchronization signal blocks and a random access message of a two-step random access procedure based at least in part on an indication, the random access message comprising a random access preamble and a random access payload;

determine, based at least in part on the mapping, an association between one or more beams carrying the synchronization signal blocks and one or more additional beams carrying the random access preamble and the random access payload of the random access message;

determine an association pattern period of the two-step random access procedure based at least in part on a second indication, wherein the association pattern period of the two-step random access procedure is based at least in part on a factor value of an association pattern period of a four-step random access procedure, the factor value comprising an integer value within a range configured by a network entity;

map resources of the synchronization signal blocks to one or more physical random access channel occasions of the random access preamble and one or more physical uplink shared channel resource units of the random access payload over physical random access channel configuration periods of the association pattern period of the two-step random access procedure; and perform the two-step random access procedure with the network entity.

58. A non-transitory computer-readable medium storing code for wireless communication at a network entity, the code comprising instructions executable by a processor to:

determine a mapping between synchronization signal blocks and a random access message of a two-step random access procedure, the random access message comprising a random access preamble and a random access payload, and the mapping comprising an association between one or more beams carrying the synchronization signal blocks and one or more additional beams carrying the random access preamble and the random access payload of the random access message;

transmit information to a user equipment comprising one or more of the mapping between the synchronization signal blocks and the random access message of the two-step random access procedure and the association between the one or more beams carrying the synchronization signal blocks and the one or more additional beams carrying the random access preamble and the random access payload of the random access message;

transmit an indication to the user equipment indicating an association pattern period of the two-step random access procedure, wherein the association pattern period of the two-step random access procedure is based at least in part on a factor value of an association pattern period of a four-step random access procedure, the factor value comprising an integer value within a range configured by the network entity;

map resources of the synchronization signal blocks to one or more physical random access channel occasions of the random access preamble and one or more physical uplink shared channel resource units of the random access payload over physical random access channel configuration periods of the association pattern period of the two-step random access procedure; and perform the two-step random access procedure with the user equipment according to the mapping.

* * * * *